(12) United States Patent
O'Donnell et al.

(10) Patent No.: US 11,661,846 B2
(45) Date of Patent: May 30, 2023

(54) SYSTEMS AND METHODS FOR REPLACING WEAR PARTS

(71) Applicant: Caterpillar Paving Products Inc., Brooklyn Park, MN (US)

(72) Inventors: Timothy M. O'Donnell, Long Lake, MN (US); Eric Steven Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/164,072

(22) Filed: Feb. 1, 2021

(65) Prior Publication Data
US 2022/0244167 A1 Aug. 4, 2022

(51) Int. Cl.
| | |
|---|---|
| *E01C 23/088* | (2006.01) |
| *E21C 35/18* | (2006.01) |
| *B23P 19/00* | (2006.01) |
| *B23P 19/04* | (2006.01) |

(52) U.S. Cl.
CPC .......... *E21C 35/188* (2020.05); *E01C 23/088* (2013.01); *E21C 35/18* (2013.01); *B23P 19/00* (2013.01); *B23P 19/04* (2013.01)

(58) Field of Classification Search
CPC ...... E01C 23/088; E21C 35/188; B23P 19/00; B23P 19/04
See application file for complete search history.

(56) References Cited

U.S. PATENT DOCUMENTS

| | | | | |
|---|---|---|---|---|
| 5,217,424 | A * | 6/1993 | Pallmann | B23Q 17/2216 483/57 |
| 6,526,641 | B1 * | 3/2003 | Latham | E21C 35/18 29/239 |
| 7,401,862 | B2 | 7/2008 | Holl et al. | |
| 7,901,010 | B2 * | 3/2011 | Busley | E01C 23/088 299/36.1 |
| 7,930,844 | B2 | 4/2011 | Quarfordt et al. | |
| 8,386,196 | B2 | 2/2013 | Wagner et al. | |
| 8,601,662 | B1 * | 12/2013 | Rankin | E21C 35/197 29/270 |
| 8,757,730 | B2 | 6/2014 | Wachsmann et al. | |
| 8,775,099 | B2 * | 7/2014 | Wagner | E01C 23/12 404/94 |

(Continued)

FOREIGN PATENT DOCUMENTS

| | | | | |
|---|---|---|---|---|
| CN | 110394778 | | 11/2019 | |
| EP | 1522636 | A1 * | 4/2005 | ............ E02F 3/9212 |
| EP | 2527118 | | 11/2012 | |

*Primary Examiner* — Janine M Kreck
(74) *Attorney, Agent, or Firm* — Lee & Hayes, P.C.

(57) ABSTRACT

A system includes a carrier assembly, a replacement tool movably supported by the carrier assembly, and a sensor configured to capture sensor data associated with a wear part removably connected to a rotatable drum. The system also includes a controller configured to receive the sensor data from the sensor, and identify the wear part using the sensor data. In such a system, the carrier assembly is configured to move the replacement tool such that an axis of the replacement tool is substantially collinear with an axis of the wear part. Additionally, the replacement tool is configured to remove the wear part from the drum while the axis of the replacement tool is substantially collinear with the axis of the wear part.

15 Claims, 5 Drawing Sheets

(56) References Cited

U.S. PATENT DOCUMENTS

| | | | |
|---|---|---|---|
| 9,863,247 B2* | 1/2018 | Von Der Lippe | E21C 25/10 |
| 2007/0132304 A1* | 6/2007 | Holl | E21C 35/18 |
| | | | 299/39.8 |
| 2013/0035874 A1* | 2/2013 | Hall | G05B 19/4065 |
| | | | 702/34 |
| 2016/0076371 A1* | 3/2016 | O'Neill | E21C 35/197 |
| | | | 299/10 |
| 2017/0167089 A1* | 6/2017 | Marsolek | G06Q 10/0631 |
| 2018/0141052 A1* | 5/2018 | Rubie | B02C 17/18 |
| 2019/0184534 A1 | 6/2019 | Berning et al. | |
| 2019/0360333 A1 | 11/2019 | Barimani et al. | |
| 2019/0366521 A1 | 12/2019 | Sansone et al. | |
| 2020/0003668 A1 | 1/2020 | Schwalbach et al. | |

* cited by examiner

SYSTEMS AND METHODS FOR REPLACING WEAR PARTS

TECHNICAL FIELD

The present disclosure relates generally to wear parts used on rotatable drums of milling machines and, more particularly, to systems and methods for replacing such wear parts based on sensor data captured by one or more sensors.

BACKGROUND

To facilitate earth working activities (e.g., paving, mining, construction, dredging, or the like), machines are often outfitted with ground-engaging tools. For instance, tools including but not limited to teeth, bits, picks, spikes, shrouds, and/or lips are commonly provided to protect underlying equipment from undue wear and/or to perform other functions. By way of non-limiting example, a cold planer or other such milling machine typically includes a rotatable drum outfitted with teeth, bits, or other replaceable wear parts configured to contact the ground and break up or dislodge materials to a desired depth. During use, such wear parts encounter heavy loading and/or highly abrasive conditions. These conditions cause such parts to become worn and, eventually, to wear out or fail. Excessive wear can result in breakage and/or loss of the wear parts, which can result in decreased productivity, increased costs in repair and/or maintenance, and other problems. Accordingly, it is desirable to monitor part wear, and to replace worn parts with new parts at shift changes or during scheduled maintenance. However, due to the size and complexity of such machines, and due to the harsh environments in which such machines are employed, it is difficult and time-consuming to replace wear parts with new parts.

Systems have been designed to assist machine operators with monitoring the wear associated with replaceable wear parts. For example, U.S. Pat. No. 8,386,196 to Wagner et al. ("the '196 patent") describes systems and methods for determining part wear using a contactless measurement method. For instance, the '196 patent describes capturing digital images of various wear parts using a camera. The '196 patent also describes characterizing the amount of wear associated with such wear parts using the captured images. For example, the '196 patent describes determining distances between wear surfaces of the imaged part and corresponding surfaces illustrated in images of unworn parts, and characterizing the imaged part based on such distances. In some examples, the system described in the '196 patent estimates a degree of wear associated with the imaged part based on these distances.

While the system described in the '196 patent is configured to evaluate the degree of wear associated with wear parts, the system is not adapted to assist in identifying one or more wear parts, included in a plurality of wear parts, in need of replacing. Additionally, the system described in the '196 patent does not include a tool configured to remove the wear part from the machine, or one or more additional components configured to align such a tool with the wear part such that the tool can be operated to remove the wear part. As a result, part wear that is evaluated by the system of the '196 patent may go unaddressed, thereby resulting in increased maintenance costs and possible machine downtime.

The present disclosure is directed to overcoming one or more of the deficiencies described above.

SUMMARY

An example of the present disclosure is directed to a system including a carrier assembly, a replacement tool movably supported by the carrier assembly, and a sensor configured to capture sensor data, the sensor data being associated with a plurality of wear parts removably connected to a rotatable drum. The example system also includes a controller configured to receive the sensor data from the sensor, and identify, using the sensor data, a wear part of the plurality of wear parts in need of replacing. Based at least in part on identification of the wear part by the controller, the carrier assembly is configured to move the replacement tool relative to the wear part such that the replacement tool mates with the wear part. Additionally, based at least in part on identification of the wear part by the controller, the replacement tool is configured to remove the wear part from the drum while the replacement tool is mated with the wear part.

Another example of the present disclosure is directed to a method that includes receiving, with a controller, sensor data from a sensor, the sensor data being associated with a plurality of wear parts removably connected to a rotatable drum. The method also includes identifying, with the controller and based on the sensor data, a wear part of the plurality of wear parts in need of replacing. The method further includes causing, with the controller, the drum to move to a replacement orientation in which the wear part is accessible by a replacement system operably connected to the controller. Additionally, the method includes controlling, with the controller, a replacement tool of the replacement system to mate with the wear part and remove the wear part from the drum.

A further example of the present disclosure is directed to a milling machine including a frame, a drum rotatable relative to the frame, a plurality of wear parts removably connected to the drum, and a sensor fixedly connected to the frame such that the plurality of wear parts is within a field of view of the sensor. The milling machine also includes a controller configured to receive sensor data from the sensor, the sensor data including an image of the plurality of wear parts. In such an example, the controller is configured to identify, based on the sensor data, a wear part of the plurality of wear parts in need of replacing. The controller is also configured to cause the drum to move to a replacement orientation in which the wear part is accessible by a replacement system operably connected to the controller, the replacement assembly comprising a carrier assembly moveable relative to the frame, and a replacement tool movably supported by the carrier assembly. Additionally, the controller is configured to control the replacement tool to mate with the wear part and remove the wear part from the drum.

DETAILED DESCRIPTION

Figure 1:
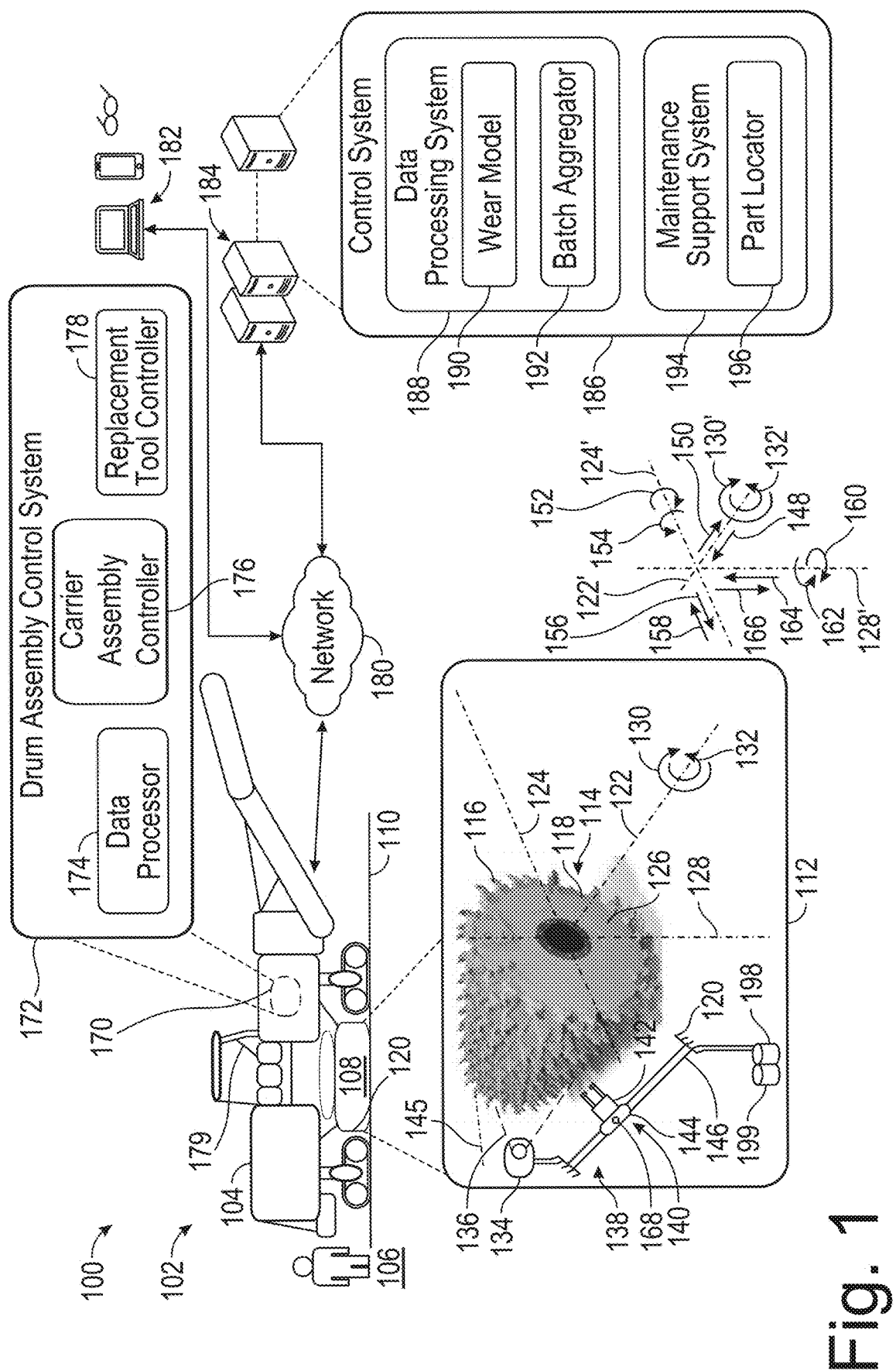
FIG. 1 illustrates a system configured to identify and/or assist in replacing one or more wear parts according to an example of the present disclosure.

This disclosure generally relates systems and methods for replacing wear parts on mobile machines. While specific wear parts are described herein relative to ground-engaging machines, earth-moving machines, and the like, the systems and methods described herein are applicable to any machine parts that wear over time due to abrasion, corrosion, impact, friction, or use in paving, mining, construction, agriculture, or other applications. Where possible, the same reference numerals are used through the drawings to refer to the same or like features.

FIG. 1 illustrates an example system 100 for replacing wear parts according to implementations of this disclosure. Components of the system 100 are configured to interact with each other to capture sensor data that, in some examples, includes images of a plurality of wear parts removably attached to a machine component, identify one or more of the wear parts illustrated in the images in need of replacing, and facilitate the removal and/or replacement of the identified wear parts. In FIG. 1, the system 100 is illustrated as being disposed, at least in part, at a paving site, construction site, mining site, quarry, excavation site, or other such worksite 102. The illustrated system 100 includes at least one milling machine, cold planer, asphalt mill, rotary mixer, earth-moving machine, mining machine, excavator, or other such machine 104 configured to perform one or more tasks at the worksite 102. In examples of the present disclosure, one or more of the machines 104 is configured to perform one or more such tasks autonomously (e.g., without receiving input from an operator 106). Alternatively, one or more of the machines 104 is configured to perform one or more such tasks semi-autonomously (e.g., based at least in part on input received from the operator 106) or under full manual control of the operator 106.

The machine 104 includes one or more parts that are susceptible to wear, e.g., resulting from forces acting on such parts during operation of the machine 104, and that must be replaced over time as a result of such wear. The example machine 104 is illustrated as a cold planer or other such milling machine for purposes of discussion, and the example machine 104 includes a drum assembly 108 configured to act on a work surface 110 on which the machine 104 is disposed. Such a work surface 110 includes, for example, pavement, concrete, asphalt, gravel, dirt, sand, overburden, and/or any other material, and example work surfaces 110 include roads, highways, parking lots, and/or other surfaces at the worksite 102 that are to be milled, ground, removed, and/or otherwise acted on by the machine 104.

As shown in an enlarged view 112 of FIG. 1, the drum assembly 108 includes a rotatable drum 114, and one or more teeth, bits, tools, or other such wear parts 116 removably connected to the drum 114. For instance, the enlarged view 112 of FIG. 1 illustrates an example substantially cylindrical drum 114 having a plurality of wear parts 116 disposed at respective locations on an outer surface 118 of the drum 114. Such wear parts 116 are illustrated as being operable on the bottom side or work surface-engaging side of the machine 104. Consequently, individual wear parts 116 may not be readily accessible for replacement in all orientations of the drum 114. Illustrative examples include causing movement of the drum 114, for example, causing the drum 114 to rotate, relative to a frame 120 of the machine 114 supporting the drum 114, to an orientation (e.g., a "replacement orientation") that presents or moves the individual wear parts 116 to a position in which the wear parts 116 are accessible for removal and/or replacement. In some examples, the machine 104 includes an access hatch, guard, or door (not pictured) that allows the operator 106 to access a portion of the drum 114 without removing the drum 114 from the machine 104. Rotating the drum 114 to the replacement orientation causes one or more wear parts 116 including, for example, individual worn wear parts 116, to be accessible for replacement. In such examples, obtaining access to one or more additional wear parts 116 disposed at other circumferential locations on the outer surface 118 of the drum 114 requires rotation of the drum 114 to a different replacement orientation corresponding to such additional wear parts 116. In any of the examples described herein causing the drum 114 to rotate and/or otherwise move to a replacement orientation positions one or more wear parts 116 such that the wear parts 116 are accessible by a replacement system operable to remove the wear parts 116 from the drum 114 and/or install one or more new wear parts 116 on the drum 114. Such example replacement systems will be described below.

In addition to or instead of the illustrated wear parts 116, the machine 104 may include other high-stress parts, tools, or wear parts including tracks made of individual track links, blades having edges for moving materials, and/or other parts that wear over time as the machine 104 is used to perform various tasks at the work site 102. In other examples, the machine 104 can be or can include a work tool, such as a saw or drill having one or more parts, such as chains, blades, edges, teeth, or bits, that wear over time with use. As used here, the term "wear parts" refers to components of the machine 104 that, during use, are subject to stress, strain, corrosion, and/or other forces that cause such parts to wear over time. The systems and methods described herein can determine wear and replacement needs of such wear parts, and can be used to remove and reinstall such wear parts regardless of the type of machine with which they are associated.

With continued reference to FIG. 1, the drum 114 includes a longitudinal axis 122 extending substantially centrally through an entire length of the drum 114. The drum 114 also includes a first transverse axis 124 (e.g., a substantially horizontal axis) disposed within a plane (not shown) that is substantially perpendicular to the longitudinal axis 122. The plane including the first transverse axis 124 may be, for example, substantially parallel to a side or a face 126 of the drum 114. The drum 114 further includes a second transverse axis 128 (e.g., a substantially vertical axis) disposed within the plane described above. In such examples, the first transverse axis 124 and the second transverse axis 128 extend substantially parallel to the face 126 of the drum 114, and extend substantially perpendicular to the longitudinal axis 122. In operation, the drum 114 is controlled to rotate about the longitudinal axis 122 in a clockwise direction 130 or a counterclockwise direction 132 to assist in removing pavement, asphalt, or other material from the work surface 110. During such processes, the one or more wear parts 116 removably connected to the rotating drum 114 impact and/or otherwise act on the work surface 110 to remove at least a portion of the work surface 112, and the removed portion of the work surface 112 is transferred from the drum assembly 108 to a haul truck or other machine at the work site 102 via one or more conveyors, augers, or other material handling components of the machine 104. Additionally, as will be described below, a replacement system of the present disclosure may be configured to transport, orient, move, and/or otherwise position a replacement tool relative to one or more wear parts 116 removably connected to the drum 114. In some examples, the replacement system includes one or more components configured to move the replacement tool along an axis 122' substantially parallel to the longitudinal axis 122 of the drum 114, along an axis 124' substantially parallel to the first transverse axis 124, and/or along an axis 128' substantially parallel to the second transverse axis. In any of the examples described here, such components are also configured to pivot and/or otherwise rotate the replacement tool about the axes 122', 124', 128'. For instance, such components of the replacement system 138 are configured to rotate the replacement tool 142 about the longitudinal axis 122' in a clockwise direction 130' or a counterclockwise direction 132' to assist in aligning the replacement tool 142 with one or more of the wear parts 116. As will be described below, in some examples the replacement tool 142 is configured to remove a wear part 116 from the drum 114 and/or to install a wear part 116 on the drum 114 while the replacement tool is aligned and/or otherwise positioned as noted above.

The system 100 shown in FIG. 1 also includes at least one sensor 134 connected to the machine 104 and disposed at a location in which at least part of the drum 114 is within a field of view 136 of the sensor 134. In some examples, the sensor 134 comprises a stationary sensor fixedly mounted to the frame 120 proximate the drum assembly 108 such that at least part of the drum 114 (e.g., at least part of the outer surface 118) and one or more of the wear parts 116 are disposed within the field of view 136 during operation of the machine 102. In other examples, the sensor 134 is mounted to one or more linkages, actuators, or other components configured to move the sensor 134 relative to the drum 114. In such examples, movement of the sensor 134 causes a corresponding change in the part of the drum 114, and in the one or more wear parts 116, disposed within the field of view 136, and such movement assists the sensor 134 (e.g., improves the ability of the sensor 134) in capturing sensor data corresponding to and/or otherwise associated with one or more of the wear parts 116. In examples, the sensor 134 may be an, optical sensor, a two-dimensional digital camera, a three-dimensional digital camera, or a range finding sensor, including but not limited to a radar sensor, a light detection and ranging (LIDAR) sensor, a proximity sensor, or the like. By way of non-limiting example, the sensor 134 can be a time-of-flight sensor configured to determine and/or generate depths associated with each captured pixel. In some examples, the sensor 134 can be moved, focused, manipulated, and/or otherwise operated by the operator 106 to capture sensor data corresponding to and/or otherwise associated with the wear parts 116. For example, the sensor data captured by the sensor 134 may include video and/or one or more images (e.g., still images) of one or more wear parts 116 removably connected to the drum 114. In some examples, the sensor 134 comprises a high-speed imaging device configured to capture such sensor data (e.g., one or more images, video, etc.) while the drum 114 is rotating about the longitudinal axis 122. Additionally or alternatively, the sensor 134 is configured to capture any of the sensor data described herein while the drum 114 is stationary (e.g., not rotating) relative to the frame 120 and/or relative to the sensor 134. In still further examples, the sensor 134 comprises a hand-held or otherwise moveable imager or sensor, and in such examples, the operator 106 can position the sensor 134 relative to the drum 114 (e.g., on a tripod disposed on the work surface 110) to capture video and/or images of one or more wear parts 116. In any of the examples described here, the sensor 134 may comprise a proximity sensor or other location device configured to identify a location on the drum 114, a location and/or orientation of one or more wear parts 116, a location and/or orientation of a replacement tool or other component of the system 100, etc. In such examples, the sensor data captured by the sensor 134 comprises coordinates, point cloud information, and/or other information indicating a location and/or orientation of an item (e.g., of a wear part 116) relative to the sensor 134 and/or relative to one or more fixed/known locations on the machine 104. It is understood that any of the sensor data described herein may include such location information and/or any of the images, video, or other information noted above with respect to the sensor 134.

As noted above, and as illustrated in FIG. 1, in some examples the system 100 includes a replacement system 138 comprising a carrier assembly 140 that is moveable relative to the frame 120 of the machine 104, and a replacement tool 142 that is movably supported by the carrier assembly 140. In any of the examples described herein, the carrier assembly 140 is configured to pivot, rotate, translate, and/or otherwise move the replacement tool 142 relative to the drum 114 and/or relative to one or more of the wear parts 116 such that an axis (e.g., a central longitudinal axis) of the replacement tool 142 (FIG. 2) is substantially collinear with an axis 145 (e.g., a central longitudinal axis) of a wear part 116 in need of replacing. In some examples, the replacement system 138 and/or the carrier assembly 140 also includes an orientation device 144 configured to pivot, rotate, translate, and/or otherwise move the replacement tool 142 relative to the drum 114 and/or relative to one or more of the wear parts 116. In such examples, rotation, translation, and/or other movement of the replacement tool 142 by the orientation device 144 positions the replacement tool 142 such that the axis of the replacement tool 142 described above is substantially collinear with the axis 145 of the wear part 116 in need of replacing. Alternatively, as will be described below, in further examples the orientation device 144 may be omitted. In any of the examples described herein, the replacement tool 142 is configured to remove a wear part 116 from the drum 114 while the replacement tool 142 is mated with the wear part 116. For example, any of the orientation devices 144 of the present disclosure are configured to move the replacement tool 142 relative to a wear part 116 such that the replacement tool 142 at least partly contacts, engages, accepts, grips, applies a force to, cuts into, removes part of, and/or otherwise mates with a portion of the wear part 116. In such examples, the orientation device 144 moves the replacement tool 142 to a replacement position in which the replacement tool 142 mates with at least a portion of the wear part 116 and the axis of the replacement tool 142 described above is substantially collinear with the axis 145 of the wear part 116. In other examples, the orientation device 144 moves the replacement tool 142 to a replacement position in which the replacement tool 142 mates with at least a portion of the wear par 116 and the axis of the replacement tool 142 extends at an included angle relative to the axis 145 between approximately zero degrees and approximately 140 degrees. For example, in some configurations the orientation device 144 moves the replacement tool 142 to a replacement position in which the replacement tool 142 mates with at least part of a tip, a washer, a spring clip, and/or other portion or component of the wear part 116. In such examples, the orientation device 144 also orients the replacement tool 142 such that the axis of the replacement tool 142 is disposed at an included angle relative to the axis 145 of the wear part 116 equal to approximately 30 degrees, approximately 45 degrees, approximately 60 degrees, and/or any other desired included angle in order to assist the replacement tool 142 in mating with the wear part 116. In such examples, components of the machine 104, such as one or more motors, actuators, machine controllers, hydraulic pumps, etc., cause the drum 114 to move to the replacement orientation described above in which the one or more wear parts 116 to be removed by the replacement tool 142 are accessible by the replacement tool 142, the orientation device 144, the carrier assembly 140, and/or by the replacement system 138, generally.

With reference to FIG. 1, in some examples the orientation device 144 includes one or more components configured to interface with the replacement tool 142, and to move the replacement tool 142 relative to the frame 120. In such examples, the orientation device 144 includes a housing configured to mate with and/or otherwise connect with the replacement tool 142. The housing of the orientation device 144 may include one or more flanges, clamps, channels, tabs, fittings, or other components configured to removably connect the housing of the orientation device 144 to a corresponding base, housing, or other component of the replacement tool 142. The orientation device 144 may also include one or more electric motors (e.g., servo motors), pneumatic actuators, hydraulic cylinders, or other actuators (FIG. 2) mounted to and/or otherwise supported by the housing of the orientation device 144 and configured to move the replacement tool 142 relative to the frame 120, the drum 114, the one or more wear parts 116, etc. For instance, in the example shown in FIG. 1, the machine 104 includes one or more rails 146 disposed proximate the drum assembly 108. The one or more rails 146 is rigidly connected to the frame 120, and in some examples, the one or more rails 146 extends substantially parallel to the longitudinal axis 122 of the drum 114. In such examples, an actuator of the orientation device 144 is configured to move the replacement tool 142 along the one or more rails 146 in the direction of arrow 148 and/or in the direction of arrow 150. As shown in FIG. 1, the direction of arrow 148 and the direction of arrow 150 are substantially parallel to the axis 122', and in such examples, the axis 122' may be a central longitudinal axis of the one more rails 146, a central longitudinal axis of the orientation device 144, etc. In such examples, and the axis 122' is substantially parallel to the longitudinal axis 122. Thus, in such examples an actuator of the orientation device 144 is configured to move the replacement tool 142 along the one or more rails 146 in a direction substantially parallel to the longitudinal axis 122.

As will be described with respect to FIG. 2, the orientation device 144 may also include one or more actuators (e.g., one or more additional actuators) configured to rotate the replacement tool 142 relative to one or more wear parts 116 of the drum 114. For example, such actuators are configured to rotate the replacement tool 142 about the longitudinal axis 122' in the clockwise direction 130' and/or the counterclockwise direction 132' to assist in aligning the replacement tool 142 with one or more of the wear parts 116.

With continued reference to the axes 124', 128' shown in FIG. 1, the orientation device 144 further includes one or more actuators (e.g., one or more additional actuators) configured to rotate the replacement tool 142 relative to the axis 124'. For example, such actuators are configured to rotate the replacement tool 142 about the axis 124' in the clockwise direction 152 and/or the counterclockwise direction 154 to assist in aligning the replacement tool 142 with one or more of the wear parts 116. The orientation device 144 may also include one or more electric motors (e.g., servo motors), pneumatic actuators, hydraulic cylinders, or other actuators (FIG. 2) mounted to and/or otherwise supported by the housing of the orientation device 144 and configured to move the replacement tool 142 in the direction of arrow 156 and/or in the direction of arrow 158. In such examples, the direction of arrow 156 and the direction of arrow 158 are substantially parallel to the axis 124', and in such examples, the axis 124' is substantially parallel to the first transverse axis 124 described above. Thus, in such examples an actuator of the orientation device 144 is configured to move the replacement tool 142 toward and/or away from the drum 114 a direction substantially parallel to the first transverse axis 124.

In addition, the orientation device 144 may include one or more actuators (e.g., one or more additional actuators) configured to rotate the replacement tool 142 relative to the axis 128'. For example, such actuators are configured to rotate the replacement tool 142 about the axis 128' in the clockwise direction 160 and/or the counterclockwise direction 162 to assist in aligning the replacement tool 142 with one or more of the wear parts 116. The orientation device 144 may also include one or more electric motors (e.g., servo motors), pneumatic actuators, hydraulic cylinders, or other actuators (FIG. 2) mounted to and/or otherwise supported by the housing of the orientation device 144 and configured to move the replacement tool 142 in the direction of arrow 164 and/or in the direction of arrow 166. In such examples, the direction of arrow 164 and the direction of arrow 166 are substantially parallel to the axis 128', and in such examples, the axis 128' is substantially parallel to the second transverse axis 128 described above. Thus, in such examples an actuator of the orientation device 144 is configured to move the replacement tool 142 toward and/or away from the drum 114 a direction substantially parallel to the second transverse axis 124.

It is understood that the movements of the replacement tool 142 by the orientation device 144 described above are merely examples, and that the components of the replacement system 138 are configured to provide multiple additional degrees of freedom relative to the wear parts 116 described herein. Further, in any of the examples described herein the replacement system 138 may include one or more additional sensors configured to capture video, still images, location information, orientation information, and/or other sensor data. For instance, in any of the examples described herein the carrier assembly may include one or more sensors 168 moveable with the replacement tool 142. In such examples, the sensor 168 is mounted on, disposed within, and/or otherwise carried by the housing of the orientation device 144. Alternatively, the sensor 168 is mounted on and/or otherwise carried by the replacement tool 142. In such examples, the sensor 168 is substantially similar to and/or the same as the sensor 136. For example, the sensor 168 may be an, optical sensor, a two-dimensional digital camera, a three-dimensional digital camera, a high-speed imaging device, or a range finding sensor, including but not limited to a radar sensor, a LIDAR sensor, a time-of-flight sensor or the like. The sensor data captured by the sensor 136 may include video and/or one or more images of one or more wear parts 116 removably connected to the drum 114.

In any of the examples described herein, the video, images, location information, orientation information, and/or other sensor data captured by the sensor 134 and/or by the sensor 168 can be used to assist in removing one or more of the wear parts 116. For instance, the machine 104 includes a machine controller 170, and in such examples at least one of the sensors 136, 168 is operably connected to and/or otherwise in communication with the machine controller 170. Such a machine controller 170 is configured to receive the video, images, location information, orientation information, and/or other sensor data captured by the sensor 136 and/or by the sensor 168. Such a machine controller 170 is also configured to identify, using such sensor data, one or more wear parts 116 removably connected to the drum 114 in need of replacing. In any of the examples, described herein, the drum 114, replacement system 138, carrier assembly 140, replacement tool 142, orientation device 144, and/or other components of the system 100 are operably connected to the machine controller 170 such that the machine controller 170 can control one or more functions thereof. For example, the machine controller 170 receives sensor data captured by the sensor 168 and enters such sensor data (e.g., video, one or more images, etc.) into an image recognition engine, algorithm, model, or other component. Such components identify the one or more wear parts 116 in need of replacing based on the received sensor data. The machine controller 170 uses the output from such components to control movement of the replacement tool 142 by the orientation device 144. In particular, the machine controller 170 uses sensor data received from the sensor 168 and/or output received from the image recognition engine or other components noted above to control operation of the orientation device 144. Such operation includes moving the replacement tool 142 to one or more of the replacement positions described herein. In an example replacement position, the replacement tool 142 is disposed such that an axis of the replacement tool 142 is substantially collinear with the axis 145, and such that one or more arms, cups, end effectors, or other components of the replacement tool 142 mate with the particular identified wear part 116. In another example replacement position, the replacement tool 142 is disposed such that a component of the replacement tool 142 mates with the particular identified wear part 116, and the axis of the replacement tool 142 extends at an included angle relative to the axis 145 between approximately zero degrees and approximately 140 degrees. The machine controller 170 also uses sensor data and/or other information from the sensor 168 to confirm that the replacement tool 142 is properly mated with and/or otherwise positioned relative to the drum 114 and/or the wear part 116 so that the replacement tool 142 can be controlled to remove the wear part 116 from the drum 114. In such examples, the sensor data received from the sensor 168 enables the machine controller 170 to control movement and operation of the orientation device 144 and/or the replacement tool 142 when removing a wear part 116 from the drum 114 and/or when installing a wear part 116 on the drum 114.

In the example shown in FIG. 1, the machine controller 170 comprises a single controller or may include more than one controller, and as used herein, the term "controller" is meant in its broadest sense to include one or more controllers, electronic control modules, processors, and/or microprocessors that are associated with a milling machine, haul truck, compaction machine, excavator, paving machine, mining machine, construction machine, or other such machine 104, and that cooperate in controlling various functions and operations of the machine 104 and/or components of the replacement systems described herein. For example, the machine controller 170 is an electronic controller that operates in a logical fashion to perform operations, execute control algorithms, store and retrieve data and other desired operations. The machine controller 170 may include or access memory, secondary storage devices, processors, and any other components for running an application. The memory and secondary storage devices are typically in the form of read-only memory (ROM) or random access memory (RAM) or integrated circuitry that is accessible by the machine controller 170. Various other circuits may be associated with the machine controller 170 such as power supply circuitry, signal conditioning circuitry, driver circuitry, and other types of circuitry. The functionality of the machine controller 170 may be implemented in hardware and/or software without regard to the functionality. In some examples, the machine controller 170 relies on one or more data maps, look-up tables, algorithms, neural networks, machine learning modules, or other components stored in a memory of the machine controller 170. Such components generally include a collection of data in the form of tables, graphs, and/or equations to maximize the performance and efficiency of the machine 104 and its operation.

In some examples, the machine controller 170 includes a control system 172 operable to receive sensor data from the sensors 136, 168, and to control operation of the replacement system 138, carrier assembly 140, the replacement tool 142, and/or orientation device 144 based at least in part on such sensor data. For example the control system 172 includes a data processor 174 configured to receive such sensor data and determine whether a wear part 116 needs replacing. Examples contemplate evaluating sensor data received from at least one of the sensors 136, 168, for example, point cloud data, an image, or a plurality of images of the wear part 116 against a wear model. Examples contemplate that the wear model is based at least in part on a tailored mathematical model of the wear, predicted wear, acceptable wear, wear patterns, or combinations thereof among others. In some examples, the wear model is based at least in part on one or more machine learning algorithms and/or models. For example, the wear model executed and/or otherwise used by the data processor 174 may identify one or more wear parts 116 in need of replacing. The data processor 174 may also provide an indication, based at least in part on the sensor data received from at least one of the sensors 136, 168, that one or more wear parts 116 are in need of replacing. In some examples, the data processor 174 utilizes such a wear model to generate an estimated time until one or more wear parts 116 removably connected to the drum 114 will need to be replaced (e.g., a wear duration).

Additionally, some components of the control system 172 are configured to assist in controlling operation of various components of the replacement systems described herein. For example, the control system 172 illustrated in FIG. 1 also includes a carrier assembly controller 176 and a replacement tool controller 178. The carrier assembly controller 176 is configured to control operation of the carrier assembly 140 when removing one or more wear parts 116 and/or when installing one or more wear parts 116 on the drum 116. For instance, the carrier assembly controller 176 is configured to control movement of the carrier assembly 140 and/or of the orientation device 144 relative to the wear parts 116. In some examples, the carrier assembly controller 176 receives sensor data from at least one of the sensors 134, 168 and identifies one or more of the wear parts 116 using image recognition programs or other components. Using such components the carrier assembly controller 176 also identifies the central axis 145 of the wear part 116, and controls the various actuators of the carrier assembly 140 and/or the orientation device 144 to position the replacement tool 142 in one or more of the replacement positions noted above. For example, in some applications, and depending on the various configurations of the replacement tool 142, the carrier assembly controller 176 controls actuators of the carrier assembly 140 and/or the orientation device 144 to move the replacement tool 142 to a replacement position in which an axis (e.g., a central axis) of the replacement tool 142 is substantially collinear with the axis 145 of the particular wear part 116 that is in need of replacement. To achieve such an example replacement position, the replacement tool controller 178 also controls the replacement tool 142 to contact, engage, and/or otherwise mate with the particular wear part 116 and/or components of the drum 114 removably connecting the wear part 116 to the drum 114.

The replacement tool controller 178 operates in conjunction with the data processor 174 and/or with the carrier assembly controller 176 to control operations of the replacement tool 142. Such control causes the replacement tool 142 to remove the wear part 116 with which the replacement tool 142 is mated from the drum 114 while the replacement tool 142 is dispose in one or more of the replacement positions described above (e.g., while the axis of the replacement tool 142 is substantially collinear with the axis 145 of the particular wear part 116). For instance, as will be described with respect to FIG. 2, in some examples the replacement tool 142 includes a cup configured to mate with at least part of the wear part 116 such as a tip of the wear part 116. In such examples, the replacement tool 142 may also include one or more arms configured to mate with a washer of the wear part 116, and one or more additional arms configured to mate with a base block disposed on the outer surface 118 of the drum 114. In such examples, the replacement tool controller 178 controls relative movement of such arms so as to remove the wear part 116 from the base block and/or from the drum 114 generally. In such examples, the replacement tool controller 178 controls activation and/or actuation of one or more electric motors, servo motors, hydraulic actuators, pneumatic actuators, and/or other actuators of the replacement tool 142 to cause removal of the wear part 116 from the drum 114 by the replacement tool 142. It is understood that the replacement tool controller 178 controls the replacement tool 142 in a similar fashion to install one or more wear parts 116 on the drum 114. It is understood that the machine controller 170 and/or components of the control system 172 are configured to cause the drum assembly 108 to rotate the drum 114 to a desired replacement orientation in which one or more wear parts 116 identified as being in need of replacement are accessible by the operator 106 and/or by components of the replacement system 138.

The machine controller 170 and/or the components of the control system 172 are in communication with and/or otherwise operably connected to one or more control systems of the worksite 102 and/or other remote control systems via a network 180. The network 180 may be a local area network ("LAN"), a larger network such as a wide area network ("WAN"), or a collection of networks, such as the Internet. Protocols for network communication, such as TCP/IP, may be used to implement the network 180. Although examples are described herein as using a network 180 such as the Internet, other distribution techniques may be implemented that transmit information via memory cards, flash memory, or other portable memory devices. It is also understood that various haul trucks, paving machines, compaction machines, milling machines, excavators, wheel loaders, mining machines, and/or other components of the system 100 include respective controllers, and each of the respective controllers are in communication and/or are otherwise operably connected via the network 180. For example, the network 180 may comprise a component of a wireless communication system associated with the worksite 102.

The network 180 may implement or utilize any desired system or protocol including any of a plurality of communications standards. Examples of wireless communications systems or protocols that may be used by the network 180 include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated.

With continued reference to FIG. 1, in any of the examples described herein the network 180 facilitates communication between the machine controller 170 and one or more electronic devices 182. Such electronic devices 182 may comprise, for example, mobile phones, laptop computers, desktop computers, tablets, and/or wearable devices (e.g., smart glasses, smart watches, etc.) of project managers (e.g., foremen) overseeing daily operations at the worksite 102. One or more such electronic devices 182 includes functionality to determine a degree of wear of the one or more wear parts 116. By way of nonlimiting example, such electronic devices 182 can receive sensor data and/or other information (e.g., point cloud data, an image, a set of images, or combinations thereof) generated by the sensor 134. In some examples, functionality of the sensor 134 and the electronic devices 182 are integrated into a single device. For example, an electronic device 182 may have an integrated sensor 134. In other examples, one or more of the electronic devices 182 receive sensor data from the sensor 134 (e.g., via a physical connection, a wireless connection, and/or a network 122).

Additionally or alternatively, the network 180 facilitates communication between the machine controller 170 and one or more worksite controllers 184 disposed remote from the machine 170. The worksite controller 184 is located, at least in part, at the worksite 102 (e.g., at a back-office or command center (not shown) disposed at the worksite 102. In some examples, the worksite controller 184 also includes components located remote from the worksite 102, such as at a remote command center. In the example of FIG. 1, the worksite controller 184 comprises one or more servers, desktop computers, processors, or other computing devices in communication with the electronic devices 182 and/or with the machine controller 170 via the network 180. The worksite controller 184 is substantially similar to and/or the same as the computing devices, processors, or other components described above with respect to the electronic devices 182 and the machine controller 170. For example, the worksite controller 184 can include processor(s) and memory communicatively coupled with the processor(s).

In some examples, the worksite controller 184 includes a control system 186 programmed and/or otherwise configured to quantify part wear. The control system 186 is also configured to generate and provide wear part replacement instructions, via the network 180, to the control system 172 in accordance with implementations described herein. The control system 186 comprises one or more software components and/or one or more hardware components of the worksite controller 184, and in some examples, the control system 186 includes components that are substantially similar to and/or the same as the components of the control system 172 described above with respect to the machine controller 170. For example, the control system 186 includes one or more components stored in the memory of the worksite controller 184 and configured to perform various operations described herein. It is understood that additionally or alternatively, the control system 172 of the machine controller 170 also includes one or more of the components described herein with respect to the control system 186.

In the example illustrated in FIG. 1, the control system 186 includes a data processing system 188 storing and/or otherwise including a wear model 190, a batch aggregator 192, and/or other components. The control system 186 also includes a maintenance support system 194 storing and/or otherwise including a part locator 196. Although the various components of the control system 186 are illustrated as, and will be described below as, separate components, functionality of the various systems and components may be attributed differently than discussed. Moreover, fewer or more systems and components may be utilized to perform the various functionalities described herein. The memory of the worksite controller 184 may also include data stores, which include models such as the illustrated wear model 190. Further, it is contemplated that the wear model 190, batch aggregator 192, part locator 196, and/or other components of the control system 186 may additionally, or alternatively, be accessible to the worksite controller 184 via the network 180 (e.g., stored on, or otherwise accessible by, memory remote from the worksite controller 184).

The data processing system 188 is substantially similar to and/or the same as the data processor 174 described above with respect to the control system 172. For example, the data processing system 188 illustrated in FIG. 1 is configured to communicate with one or more of the machine controller 170, sensors 134, 168, and/or the electronic devices 182 via the network 180. The data processing system 188 is generally configured to receive sensor data and/or other information generated by the sensors 134, 168, and determine whether a wear part 116 is in need of replacement. Examples contemplate evaluating sensor data from the sensor 134, for example, point cloud data, video data, an image, or a plurality of images of the wear part 116 against the wear model 190. Examples also contemplate that the wear model 190 is based at least in part on a tailored mathematical model of the wear, predicted wear, acceptable wear, wear patterns, or combinations thereof among others. Examples further contemplate that the wear model 190 is based at least in part on one or more machine learning algorithms and/or models. For instance, in the example of FIG. 1 the wear model 190 provides an indication that, based at least in part on the sensor data from the sensor 134, the wear part 116 needs to be replaced. In such examples, the wear model 190 can generate instructions for replacing the wear part 116, and such instructions can be executed by the carrier assembly controller 176 and/or by the replacement tool controller 178 to facilitate replacement of the wear part 116 by the replacement system 138. The wear model 190 can also generate an estimated time until the wear part 116 will need to be replaced, and can generate one or more notifications including such information. Such notifications can be output by the display 179.

In some examples, the wear model 190 employed by the data processing system 188 is based on training data. For example, the training data includes information on wear parts 116 including, but not limited to, one or more images of each wear part 116, a designation as to whether a particular wear part 116 should be replaced, a time in service of the particular wear part 116, a model number or serial number identifying the particular wear part 116, a manufacturer of the wear part 116, among other information. Based at least in part on this training data, the wear model 190 is generated, refined, or tailored to suit a machine, a model of machine, a type of machine, an operating environment of a machine, a configuration of a machine, etc.

Additionally or alternatively, depending on the configuration of the system 100, different machines 104 may be configured with different tools. For example, in a first environment, a road milling machine is configured with a first drum (e.g., (competition rotor, spade rotor, varied bit density) fitted with a first type of tool holder holding a first type of tool. In a second environment, the road milling machine is configured with a second drum fitted with a second type of tool holder holding a second type of tool. In a third environment, the road milling machine is configured with either the first or second drum and is fitted with the first and/or second type of tool holder holding the first and/or second type of tool. In these examples, the wear model 190 is tailored to each configuration of the machine 104 or a representative configuration of the machine 104. Additionally or alternatively, the wear model 190 is tailored to individual tool and tool holder configurations. For example, a first location on a mill fitted with the first type tool holder holding the first type of tool is monitored and/or evaluated with a first wear model 190, while a second location on the mill fitted with the second type of tool holder holding the second type of tool is monitored and/or evaluated with a second wear model 190.

Additionally or alternatively, the data processing system 188, may also be configured to receive sensor data and/or other information generated by at least one of the sensors 134, 168, and determine which wear model 190 is applicable. Examples contemplate evaluating sensor data from the sensor 134, for example, point cloud data, video, an image, or a plurality of images of the machine 104, a configuration of the drum 114, a wear part 116, tool holder, among others, to determine a wear model 190. In this example, the determined wear model 190 is then applied to the configuration of the machine 104 to determine wear.

The batch aggregator 192 of the data processing system 188 comprises a component configured to collect, store, and/or analyze sensor data and/or other information received from the sensor 134 and/or from the sensor 168 at regular, predicted, or predetermined intervals, such as at an expected inspection period. In these examples, the batch aggregator 192 combines such received information to further evaluate output from wear model 190 and/or wear trends or other patterns associated with the wear parts 116 used with the drum assembly 108. For example, when the wear model 190 generates an estimated time until the a particular wear part 116 will need to be replaced (e.g., the wear duration of the wear part 116), the batch aggregator 192 groups the particular wear part 116 with other wear parts having similar estimated times until needed replacement, or groups wear parts having a wear duration ending before the next inspection, predicted inspection, or estimated inspection. For example, based on collected data, the wear model 190 determines that a first wear part 116 has a first wear duration, a second wear part 116 has a second wear duration, and a third wear part 116 has a third wear duration. In this example, the first and second wear durations may be less than the expected inspection period or may end before the next inspection, while the third wear duration may be greater than the expected inspection period or end after the next inspection period. In this case, the batch aggregator 192 aggerates the first and second wear parts 116 together in a first batch and the third wear part 116 in a second batch. In this example, the data processing system 188 returns an indication that the first and second wear parts 116 need to be replaced. The data processing system 188 retains the second batch for further processing or may flag the associated wear parts 116 for future monitoring.

In examples of the present disclosure, the data processing system 188 shown in FIG. 1 is operable to reduce the amount of time that the machine 104, is down for maintenance to replace wear parts 116 by identifying and causing replacement of other wear parts 116 that would likely be worn before the next anticipated part inspection. The data processing system 188 also reduces the number of unnecessary early replacements of wear parts 116 preventing a fuller consumption of the wear parts 116, and reduces the number of late replacement of wear parts 116 that cause damage to the underlying support or other parts of the machine 104, for example the drum 114. Said another way, these techniques are used to avoid an inaccurate calculation of wear, which may result in overuse of wear parts 116 e.g., causing disruptive failures, and/or underuse of wear parts 116, thereby increasing cost. Additionally, in any of the examples described herein, one or more of the techniques described above with respect to the data processing system 188, the wear model 190, and/or the batch aggregator 192 may be performed, in whole or in part, by the data processor 174 and/or by other components of the machine controller 170. In some such examples, the data processing system 188 can be omitted.

The maintenance support system 194 shown in FIG. 1 represents one or more computing systems associated with specific machines 104, machine models, machine databases, fleets of machines 104, or combinations thereof, configured to manage preventative maintenance and, in particular, to manage replacement of one or more wear parts 116. In some implementations, each wear part 116 is associated with a specific machine, e.g., machine 104, and a specific location on the machine 104. Information identifying the specific wear parts 116, the corresponding machines 104, the corresponding locations on such machines 104, etc. is determined by and/or stored by the part locator 196 or other similar a database. For example, the part locator 196 stores and/or categorizes information indicating the particular location on the drum 114 that corresponds to a particular wear part 116, as well as information indicating the particular vehicle identification number, license plate number, or other identifier uniquely identifying the machine 104. The part locator 196 can also aggregate such information across multiple databases, platforms, fleets, among others, or combinations thereof. Additionally or alternatively, in various examples, data stored by the part locator 196 is supplied to the operator 106 through the display 179 and via the network 180.

With continued reference to FIG. 1, in some examples, the system 100 also includes a part supply and a part return 199. The part supply 198 and the part return 199 typically comprise one or more bins, racks, containers, sleeves, or other components configured to store new wear parts 116 (in the case of the part supply 198) and removed/worn wear parts 116 (in the case of the part return 199). In some examples, the part supply 198 and the part return 199 are connected to and/or otherwise supported by the frame 120, and located proximate the replacement system 138. In such examples, the part supply 198 and the part return 199 are easily accessible by the replacement tool 142 and/or by the carrier assembly 140, and the replacement tool 142 is configured to deposit a removed wear part 116 in the part return 199 upon removal of the wear part 116 from the drum 114. Likewise, the replacement tool 142 is configured to remove a new wear part 116 from the part supply 198 so that the replacement tool 142 can install the removed wear part 116 onto the drum 114 at a desired location. In other examples, on the other hand, the part supply 198 and the part return 199 comprise components of and/or are carried by the carrier assembly. In such examples, the replacement tool 142 can deposit wear parts 116 in the part return 119 and remove wear parts 116 from the part supply 198 more quickly and without, for example, maneuvering to one or more locations on the frame 120 at which the part supply 198 and/or the part return 199 are disposed.

Example components of the replacement system 138 will be described in greater detail below with respect to FIG. 2, and additional example replacement systems will be described with respect to FIGS. 3 and 4. It is understood that any of the replacement systems described herein can be used to assist in identifying one or more wear parts 116 in need of replacement, and to facilitate removal of such wear parts 114 from the drum 114.

Figure 2:
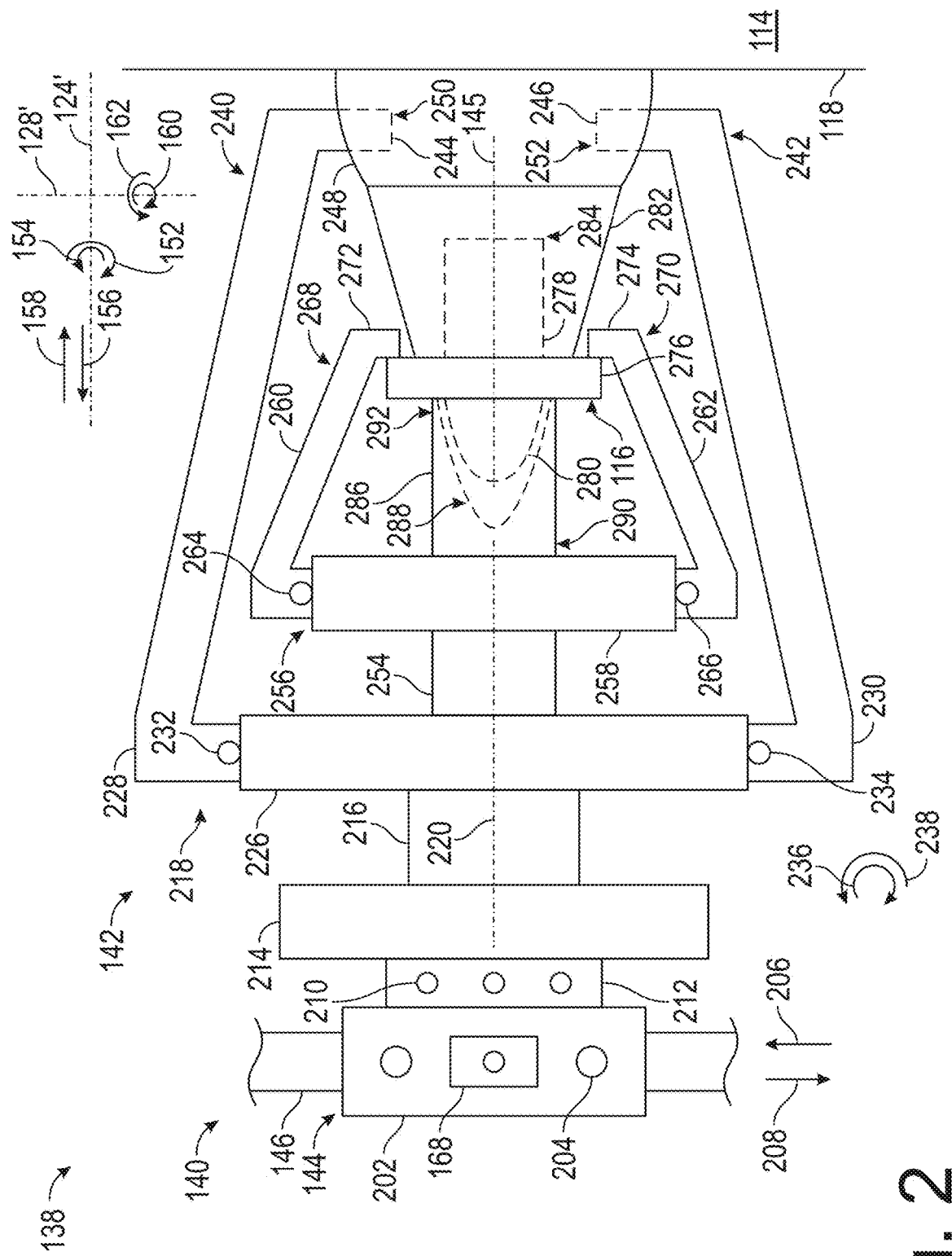
FIG. 2 illustrates a carrier assembly and a replacement tool associated with the system shown in FIG. 1 according to an example of the present disclosure.

FIG. 2 illustrates components of the example replacement system 138 of FIG. 1 in greater detail. As shown in FIG. 2, the example orientation device 144 of the replacement system 138 includes a housing 202 configured to mate with the replacement tool 142, and to carry and/or otherwise support one or more actuators 204. As noted above with respect to FIG. 1, the orientation device 144 is configured to move the replacement tool 142 in directions along the one or more rails 146 supported by the frame 120. Such directions, identified by arrow 206 and arrow 208 in FIG. 2, are substantially parallel to the longitudinal axis 122 of the drum 114. Accordingly, the direction represented by arrow 206 is the same as the direction represented by arrow 148 (FIG. 1), and the direction represented by arrow 208 is the same as the direction represented by arrow 150 (FIG. 1). In any of the examples described herein, the actuators 204 of the orientation device 144 are configured to move the housing 202 of the orientation device 144, and thus to move the replacement tool 142 connected to the housing 202, along the rails 146 in the direction of arrows 206, 208. For example, the actuators 204 include one or more electric motors (e.g., servo motors), pneumatic actuators, hydraulic cylinders, or other components mounted to and/or otherwise supported by the housing 202 of the orientation device 144 and configured to move the replacement tool 142 relative to the frame 120, the drum 114, the one or more wear parts 116, etc.

The orientation device 144 also includes one or more actuators 210 (e.g., one or more additional actuators 210) configured to rotate the replacement tool 142 relative to one or more wear parts 116 of the drum 114. For example, such actuators 210 are configured to rotate the replacement tool 142 about the longitudinal axis 122' (FIG. 1) in the clockwise direction 130' and/or the counterclockwise direction 132' to assist in aligning the replacement tool 142 with one or more of the wear parts 116. It is understood that the clockwise direction 130' shown in FIG. 1 corresponds to the clockwise direction 236 shown in FIG. 2, and that the counterclockwise direction 132' shown in FIG. 1 corresponds to the counterclockwise direction 238 shown in FIG. 2.

The orientation device 144 further includes one or more electric motors (e.g., servo motors), pneumatic actuators, hydraulic cylinders, or other actuators 210 (e.g., one or more additional actuators 210) configured to rotate the replacement tool 142 relative to the axis 124'. For example, such actuators 210 are configured to rotate the replacement tool 142 about the axis 124' in the clockwise direction 152 and/or the counterclockwise direction 154 to assist in aligning the replacement tool 142 with one or more of the wear parts 116. The orientation device 144 also includes one or more additional actuators 210 configured to move the replacement tool 142 in the direction of arrow 156 and/or in the direction of arrow 158. Thus, in such examples an actuator 210 of the orientation device 144 is configured to move the replacement tool 142 toward and/or away from the drum 114 a direction substantially parallel to the first transverse axis 124.

In addition, the orientation device 144 includes one or more actuators 210 (e.g., one or more additional actuators 210) configured to rotate the replacement tool 142 relative to the axis 128'. For example, such actuators 210 are configured to rotate the replacement tool 142 about the axis 128' in the clockwise direction 160 and/or the counterclockwise direction 162 to assist in aligning the replacement tool 142 with one or more of the wear parts 116. The orientation device 144 also includes one or more actuators 210 configured to move the replacement tool 142 in the direction of arrow 164 and/or in the direction of arrow 166 (FIG. 1). Thus, in such examples an actuator 210 of the orientation device 144 is configured to move the replacement tool 142 toward and/or away from the drum 114 a direction substantially parallel to the second transverse axis 124.

In some examples of the present disclosure, the orientation device 144 includes a single housing 202 configured to contain, support, and/or otherwise carry each of the actuators 204, 210 described herein. In additional examples, the orientation device 144 includes a first housing 202 configured to carry at least one of the actuators 204, 210 associated with moving the orientation device 144 along the one or more rails 146. In such an example, the orientation device 144 includes one or more additional housings 212 connected to the housing 202 and configured to carry at least one of the additional actuators 204, 210 described herein. In such examples, the housing 212 is fixedly connected to the housing 202 while the one or more actuators 210 carried by the housing 212 are configured to move the replacement tool 142 relative to the housing 202. In additional examples, on the other hand, the housing 212 is movably connected to the housing 202, and in such examples movement of the replacement tool 142 by the various actuators 210 carried by the housing 212 can result in commensurate movement of the housing 212 relative to the housing 202.

In any of the examples described herein, the replacement tool 142 is removably connected to at least one of the housings 202, 212. For example, the replacement tool 142 includes a base 214 configured to support various components of the replacement tool 142 during the removal and/or installation of one or more wear parts 116. In such examples, the base 214 comprises a substantially rigid housing, plate, platform, and/or other structure configured to mate with the housing 212 and/or with the housing 202. For example, the base 214 includes one or more tabs, clamps, channels, fittings, through holes, flanges, and/or other devices configured to couple with one or more corresponding devices of the housing 212. In the example of FIG. 2, the replacement tool 142 includes an actuator 216 carried by the base 214 and configured to move one or more components of the replacement tool 142 relative to the base 214. For example, the actuator 216 includes one or more electric motors (e.g., servo motors), pneumatic actuators, hydraulic cylinders, or other actuation devices configured to move a first assembly 218 of the replacement tool 142 relative to the base 214. In such examples, the actuator 216 is configured to move the first assembly 218, and/or components of the replacement tool 142 connected thereto, in the direction of arrows 156, 158, along an axis 220 (e.g., a central longitudinal axis) of the replacement tool 142. As shown in FIG. 2, the various actuators 204, 210 of the orientation device 144 are configured to orient and/or otherwise move the replacement tool 142 relative to a wear part 116 carried by the drum 114, and to dispose the replacement tool 142 in one or more of the replacement positions noted above. For instance, to achieve an example replacement position the orientation device 144 moves the replacement tool 142 such that the replacement tool 142 engages at least a portion of the wear part 116, and such that the axis 220 of the replacement tool 142 is substantially collinear with the axis 145 of the wear part 116. To achieve another example replacement position, the orientation device 144 moves the replacement tool 142 such that the replacement tool 142 engages at least a portion of the wear part 116, and such that the axis 220 is disposed at an included angle, relative to the axis 145 of the wear part 116 equal to between approximately zero degrees and approximately 140 degrees. It is understood that, in further examples, additional included angles between the axes 125, 220 are contemplated. In some examples the actuator 216 comprises one or more hydraulic cylinders configured to expand or extend from the base 214 in the direction of arrow 158, and to retract relative to the base 214 in the direction of arrow 156. This configuration of the actuator 216 assists in moving the first assembly 218 in the direction of arrows 156, 158.

In some examples, the first assembly 218 includes a first platform 226 connected to the actuator 216. The first platform 226 comprises a substantially planar, substantially rigid plate, beam, shaft, and/or other component configured to support various components of the replacement tool 142 connected thereto, and to withstand impacts, vibration, stress, strain, torque, loads, and/or other forces associated with removing a wear part 116 from the drum 114 and/or installing a wear part 116 onto the drum 114. The first assembly 218 also includes one or more arms 228, 230 movably connected to the first platform 226 and configured to engage, contact, grasp, and/or otherwise mate with at least part of the drum 114 or one or more components connected to the outer surface 118 of the drum 114. As shown in FIG. 2, one or both of the arms 228, 230 extend laterally from the first platform 226 substantially in the direction of arrow 158. With this configuration, the arms 228, 230 extend from the first platform 226 toward the drum 114 while the replacement tool 142 is mated with the wear part 116. For example, the first assembly 218 includes an actuator 232 configured to move the arm 228 relative to the first platform 226, and also includes an actuator 234 configured to move the arm 230 relative to the first platform 226. As described above with respect to at least the actuators 210, actuators 232, 234 are configured to rotate the arms 228, 230 relative to the first platform 226 to assist with engaging one or more components disposed on the outer surface 118 of the drum 114. For example, the actuator 232 is configured to rotate the arm 228 in a clockwise direction 236 to engage one or more such components, and the actuator 234 is configured to rotate the arm 230 in a counterclockwise direction 238 to engage such components. Similarly, the actuator 232 is configured to rotate the arm 228 in the counterclockwise direction 238 to disengage such components, and the actuator 234 configured to rotate the arm 230 in the clockwise direction 236 to disengage such components.

The arm 228 includes an end 240 disposed opposite the first platform 226 and/or opposite the actuator 232. Similarly, the arm 230 includes an end 242 disposed opposite the first platform 226 and/or opposite the actuator 234. The end 240 includes an end effector 244, and the end 242 includes an end effector 246. In such examples, the end effectors 244, 246 comprise distal ends, tips, and/or other portions of the respective arms 228, 230 configured to engage, contact, grasp, and/or otherwise mate with at least part of the drum 114 or one or more components connected to the outer surface 118 of the drum 114. For example, as shown in FIG. 2, the drum 114 includes one or more base blocks 248 fixedly connected to the outer surface 118 of the drum 114. Each of the respective base blocks 248 is configured to support one or more additional components configured to removably connect a respective wear part 116 to the drum 114. For example, the base block 248 comprises a substantially rigid base, platform, and/or other structure that is welded, bolted, and/or otherwise connected to the drum 114 so as to fix a position of a corresponding wear part 116 relative to the outer surface 118. For instance, as will be described below, a part holder is fixedly connected to the base block 248, and the part holder includes a channel, recess, and/or other component configured to retain at least a portion of the wear part 116 while the wear part 116 is removably connected to the drum 114. In any of the examples described herein, the base block 248 includes one or more recesses 250, 252, shelfs, flanges, tabs, extensions, detents, channels, ridges, or other components with which the arms 228, 230 engage while removing a wear part 116 from the drum 114 and/or while installing a new wear part 116 on the drum 114. In the example shown in FIG. 2, at least part of the end 240 (e.g., at least part of the end effector 244) engages, is disposed at least partly within, contacts, and/or otherwise mates with the recess 250 while the replacement tool 142 removes the wear part 116 from the drum 114. Similarly, at least part of the end 242 (e.g., at least part of the end effector 246) engages, is disposed at least partially within, contacts, and/or otherwise mates with the recess 252 while the replacement tool 142 removes the wear part 116 from the drum 114.

In the example of FIG. 2, the replacement tool 142 also includes an actuator 254 carried by the first platform 226 and configured to move one or more additional components of the replacement tool 142 relative to the base 214. For example, the actuator 254 includes one or more electric motors (e.g., servo motors), pneumatic actuators, hydraulic cylinders, or other actuation devices configured to move a second assembly 256 of the replacement tool 142 relative to the base 214 and/or relative to the first platform 226 of the first assembly 218. In such examples, the actuator 254 is substantially similar to and/or the same as the actuator 216. For instance, the actuator 254 is configured to move the second assembly 256, and/or components of the replacement tool 142 connected thereto, in the direction of arrows 156, 158, along the axis 220 of the replacement tool 142. In some examples the actuator 254 comprises one or more hydraulic cylinders configured to expand or extend from the first platform 226 in the direction of arrow 158, and to retract relative to the first platform 226 in the direction of arrow 156. This configuration of the actuator 254 assists in moving the second assembly 256, relative to the first assembly 218, in the direction of arrows 156, 158. Such movement of the second assembly 256, relative to the first assembly 218, assists in removing a wear part 116 from the drum 114 and/or with installing the wear part 116 on the drum 114.

In some examples, the second assembly 256 includes a second platform 258 connected to the actuator 254. The second platform 258 is substantially similar to and/or the same as the first platform 226. For example, the second platform 258 comprises a substantially planar, substantially rigid plate, beam, shaft, and/or other component configured to support various components of the replacement tool 142 connected thereto, and to withstand impacts, vibration, stress, strain, torque, loads, and/or other forces associated with removing a wear part 116 from the drum 114 and/or installing a wear part 116 onto the drum 114. The second assembly 256 also includes one or more arms 260, 262 movably connected to the second platform 258 and configured to engage, contact, grasp, and/or otherwise mate with at least part of the wear part 116 when removing the wear part 116 from the drum 114. As shown in FIG. 2, one or both of the arms 260, 262 extend laterally from the second platform 258 substantially in the direction of arrow 158. With this configuration, the arms 260, 262 extend from the second platform 258 toward the drum 114 while the replacement tool 142 is mated with the wear part 116.

The second assembly 256 also includes an actuator 264 configured to move the arm 260 relative to the second platform 258, and an actuator 266 configured to move the arm 262 relative to the second platform 258. As described above with respect to at least the actuators 210, the actuators 264, 266 are configured to rotate the arms 260, 262 relative to the second platform 258 to assist with engaging one or more wear parts 116 removably connected to the drum 114. For example, the actuator 264 is configured to rotate the arm 260 in a clockwise direction 236 to engage one or more such wear parts 116, and the actuator 266 is configured to rotate the arm 262 in a counterclockwise direction 238 to engage such wear parts 116. Similarly, the actuator 264 is configured to rotate the arm 260 in the counterclockwise direction 238 to disengage such wear parts 116, and the actuator 266 is configured to rotate the arm 262 in the clockwise direction 236 to disengage such wear parts 116.

The arm 260 includes an end 268 disposed opposite the second platform 258 and/or opposite the actuator 264. Similarly, the arm 262 includes an end 270 disposed opposite the second platform 258 and/or opposite the actuator 266. The end 268 includes an end effector 272, and the end 270 includes an end effector 274. In such examples, the end effectors 272, 274 comprise distal ends, tips, and/or other portions of the respective arms 260, 262 configured to engage, contact, grasp, and/or otherwise mate with at least part of a wear part 116. For example, as shown in FIG. 2, the wear part 116 includes one or more shelfs, flanges, tabs, extensions, detents, channels, ridges, washers 276, and/or other components with which the arms 262, 262 engage while removing a wear part 116 from the drum 114 and/or while installing a new wear part 116 on the drum 114.

In the example shown in FIG. 2, the wear part 116 includes an annular washer 276 that is movably disposed on a spring clip 278 of the wear part 116. For instance, the spring clip 278 comprises a substantially hollow, substantially cylindrical shaft or other such component, and the spring clip 278 includes a spring or other biasing member disposed therein. Such a biasing member biases the washer 276 toward a proximal end of the wear part 116 (e.g., in the direction of arrow 158 when the wear part is oriented as shown in FIG. 2), and away from a distal tip 280 of the wear part 116. The distal tip 280 comprises a diamond tip, a hardened steel tip, and/or other configuration, and the distal tip 280 is configured to engage and act on the work surface 110 during use of the drum 114. When the wear part 116 is installed into a part holder 282 fixedly connected to the base block 248, contact between the washer 276 and the part holder 282 moves the washer distally toward the distal tip 280. For example, as the spring clip 278 is disposed within a recess 284 of the part holder 282 by moving the spring clip 278 toward the base block 248 (e.g., in the direction of arrow 156), the washer 276 engages the part holder 282, and the part holder 282 moves the washer 276 in the direction of arrow 156 relative to the spring clip 278.

The second assembly 256 also includes a cup 286 configured to engage the distal tip 280, the washer 276, and/or other components of the wear part 116. In the example of FIG. 2, the cup 286 is fixedly or movably mounted to the second platform 258, and the cup 286 includes a recess 288 shaped, sized, and/or otherwise configured to accept at least part of the distal tip 280 therein when the replacement tool 142 is mated with the wear part 116. For example, as shown in FIG. 2 a first end 290 of the cup 286 is fixedly or movably connected to the second platform 258, and the cup 286 includes a substantially conical and/or a substantially dome-shaped internal recess 288 extending from a second end 292 of the cup 286 toward the first end 290. Such a recess 288 is configured to accept substantially the entire distal tip 280 of a new unworn wear part 116.

When installing such a new wear part 116 into the part holder 282 and/or onto the drum 114, the end effectors 272, 274 of the arms 260, 262 engage the washer 276, and urge the washer 276 in the direction of arrow 156 such that the washer 276 and/or at least part of the distal tip 280 is held in contact with the end 292 of the cup 286. In such examples, the cup 286 may move in the direction of arrow 158 relative to the second platform 258 and/or relative to the ends 268, 270 to assist with engaging the wear part 116. Additionally or alternatively, when installing a new wear part 116 into the part holder 282, the end effectors 272, 274 may move in the direction of arrow 156 relative to the second platform 258 and/or relative to the cup 286 to assist with engaging the wear part 116. When installing or removing the wear part 116, the second platform 258 may move in the direction of arrows 156, 158 relative to the first platform 226. Additionally or alternatively, when installing or removing the wear part 116, the first platform 226 may move in the direction of arrows 156, 158 relative to the second platform 258. The components of the replacement tool 142 described with respect to FIG. 2, and the relative movement of such components assists the replacement tool 142 with removing and installing wear parts 116 in any of the examples described herein. Moreover, such replacement tools 142 are configured for use with any of the replacement systems described herein. It is understood that the replacement tool 142 and the replacement system 138 described above are configured to remove and install such wear parts 116 in a manner that minimizes downtime of the machine 104. As a result, the replacement system 138 described above improves worksite efficiency, and can minimize maintenance costs associated with wear part failure and/or premature replacement of wear parts 116. The replacement system 138 also improves worksite safety by reducing the risk of injury associated with manually replacing such wear parts 116.

Figure 3:
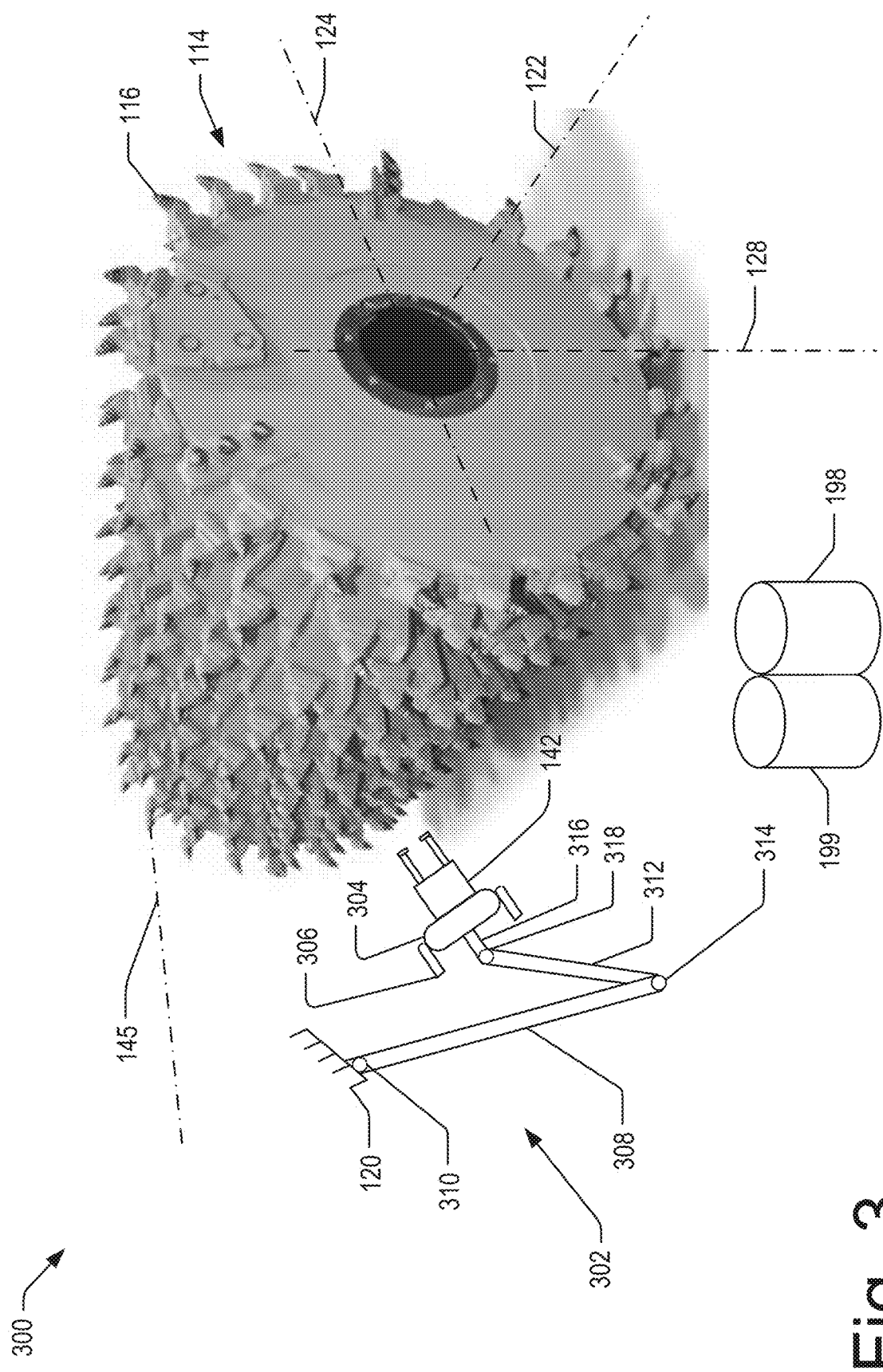
FIG. 3 illustrates a replacement system according to another example of the present disclosure.

FIG. 3 illustrates an additional replacement system 300 of the present disclosure in which such a replacement tool 142 is employed. The replacement system 300 includes a carrier assembly 302 having an orientation device 304 configured to move the replacement tool 142 in multiple directions relative to one or more wear parts 116 removably connected to the drum 114. In the example shown in FIG. 3, at least part of the carrier assembly 302 is movably connected to the frame 120 of the machine 104 (FIG. 1). In such examples, one or more components of the replacement system 300 are semi-manually movable or fully-manually moveable relative to the frame 120 such as, by the operator 106. For example, the carrier assembly 302 includes one or more linkages, and at least one of the linkages is movably connected to the frame 120 and/or to other components of the carrier assembly 302, via one or more actuators similar to the actuators 204, 210 described above. In such "semi-manual" examples, these actuators are configured to at least partially assist the operator 106 with moving the replacement tool 142 and/or other components of the carrier assembly 302 while removing a wear part 116 from the drum 114, and/or while installing such a wear part 116 on the drum 114. In a "fully-manual" example of the replacement system 300, on the other hand, such actuators are omitted.

As shown in FIG. 3, the example orientation device 304 of the replacement system 300 includes one or more handles 306 maneuverable or otherwise "grippable" by the operator 106 to assist the operator 106 in desirably positioning the replacement tool 142. Such handles 306 extend from a housing of the orientation device 304. In such examples, the various actuators 204, 210 noted with respect to the example orientation device 144 of FIG. 2 are omitted from the orientation device 304.

Moreover, the carrier assembly 302 of the replacement system 300 includes a linkage 308 movably connected to the frame 120 of the machine 104 via a joint 310. The linkage 308 comprises one or more shafts, beams, rods, and/or other substantially rigid structures configured to support the weight of the replacement tool 142 and/or other components of the carrier assembly 302 movably mounted to the frame 120. The joint 310 includes, for example, one or more bearings, bushings, ball joints, and/or other such fittings configured to allow complete freedom of movement and/or range of motion between the linkage 308 and the frame 120. The carrier assembly 302 can include one or more additional linkage-joint configurations as needed to provide optimal freedom of motion of the replacement tool 142 relative to the frame 120. For example, as shown in FIG. 3 the carrier assembly 302 also includes a linkage 312 movably connected to the linkage 308 via a joint 314. In some examples, the replacement tool 142 is movably connected to the linkage 312 and manually movable relative to the frame 120. In some examples, the carrier assembly 302 also includes a linkage 316 movably connected to the linkage 312 via a joint 318. In any such examples, a housing of the orientation device 304 is fixedly or movably connected to one or more of the linkages 308, 312, 316 described above, and the replacement tool 142 is connected to the housing of the orientation device 304.

In such examples, the replacement system 300 provides an additional means for removing one or more wear parts 116 from the drum 114 and/or for installing one or more such wear parts 116 on the drum 114. In addition to one or more of the aspects descried with respect to the replacement system 138 above, the replacement system 300 of FIG. 3 also reduces operator fatigue associated with removing wear parts 116 from the drum 114 and/or with installing new wear parts 116. As a result, operator safety and efficiency are improved.

Figure 4:
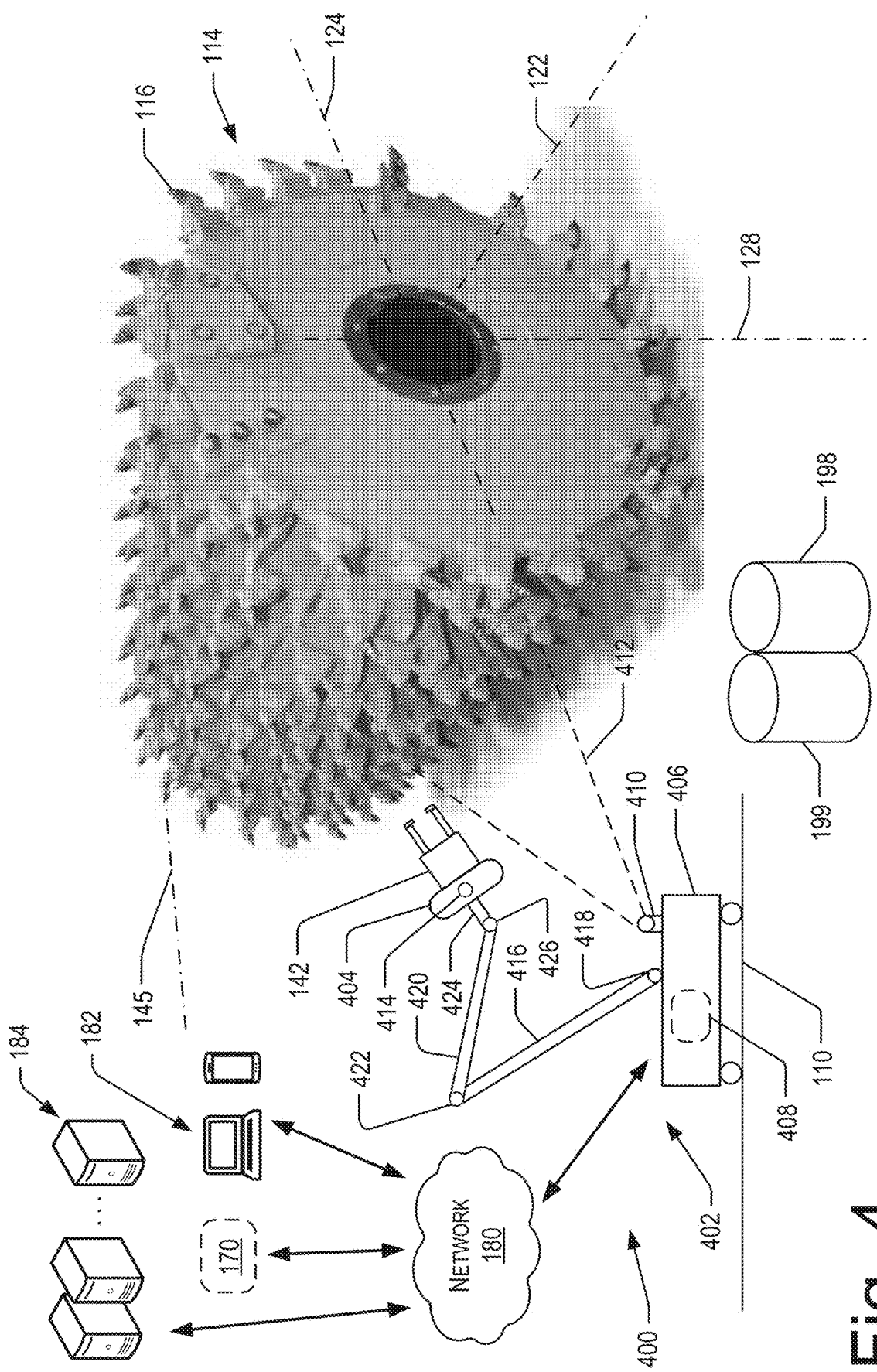
FIG. 4 illustrates a replacement system according to still another example of the present disclosure.

FIG. 4 illustrates another example replacement system 400 of the present disclosure in which a replacement tool 142 is employed. The replacement system 400 includes a carrier assembly 402 having an orientation device 404 configured to move the replacement tool 142 in multiple directions relative to one or more wear parts 116 removably connected to the drum 114. In the example shown in FIG. 4, the carrier assembly 402 comprises an autonomous rover 406 operably connected to the machine controller 170, one or more of the electronic devices 182, and/or the worksite controller 184. For example, the rover 406 includes a controller 408 that is operably connected to the machine controller 170, and/or to one or more of the other devices/controllers described above, via the network 180. The rover 406 is configured to traverse the work surface 110 at the worksite 102 to assist in positioning the replacement tool 142 relative to the one or more wear parts 116 in need of replacing. The orientation device 404 shown in FIG. 4 is configured to move the replacement tool 142 relative to such wear parts 116 in any of the manners described above, and the orientation device 404 is substantially similar to and/or the same as the orientation device 144 described above with respect to at least FIG. 2. For example, the orientation device 404 includes one or more actuators configured to move the orientation device 404, and/or configured to move the replacement tool 142, relative to such wear parts 116. In the example of FIG. 4, the orientation device and/or other controllable components of the replacement system are operably connected to the controller 408 of the rover 406, and the controller 408 is configured to control operation thereof to remove one or more wear parts 116 from the drum 114 and/or to install one or more wear parts 116 on the drum 114.

The rover 406 shown in FIG. 4 comprises any on-road or off-road vehicle configured to controllably traverse a portion of the work surface 110 and occupy a location in which the replacement tool 142 can access one or more of the wear parts 116 removably connected to the drum 114. In some examples, the rover 406 comprises a semi-autonomous or fully autonomous machine that can be controlled, at least in part, based on instructions received, by the controller 408, from the machine controller 170, the electronic devices 182, and/or the worksite controller 184. The rover 406 includes a set of wheels, tracks, or other ground-engaging elements, as well as a power source for driving movement of such ground-engaging elements. The power source is at least one of a conventional internal combustion engine operating on fossil or hybrid fuels, and an electrically operated drive powered by alternate energy sources (e.g., a battery, solar power, etc.). The controller 408 of the rover 406 is substantially similar to and/or the same as the machine controller 170 and/or the worksite controller 184 described above, and the controller 408 includes one or more processors, memory, and/or other components included in the machine controller 170 and/or the worksite controller 184.

The rover 406 also includes a communication device (not shown) and a location sensor (not shown) operably and/or otherwise connected to the controller 408. The communication device is configured to permit wireless transmission of a plurality of signals, instructions, and/or information between the controller 408 and, for example, the machine controller 170 and/or the worksite controller 184. The communication device includes a transmitter configured to transmit signals to a receiver of, for example, the machine controller 170 and/or the worksite controller 184. The communication device also includes a receiver configured to receive such signals. In some examples, the transmitter and the receiver of the communication device are combined as a transceiver or other such component. In any of the examples described herein, the communication device enables communication between the controller 408 and other system components via the network 180.

The location sensor of the rover 406 is configured to determine a location and/or orientation of the rover 406 at the worksite 102. In some examples, the location sensor includes a component of global navigation satellite system (GNSS) or a global positioning system (GPS). Alternatively, universal total stations (UTS) is utilized to locate respective positions of the rover 406. In some examples, the location sensor of the rover 406 comprises a GPS receiver, transmitter, transceiver, laser prisms, and/or other such device, and the location sensor is in communication with one or more GPS satellites and/or UTS to determine a respective location of the rover 406 continuously, substantially continuously, or at various time intervals. In such examples, the machine 104 can also include a similar location sensor in communication with the one or more GPS satellites and/or UTS, and such GPS satellites and/or UTS are configured to determine respective locations of the machine 104 as well. In any of the examples described herein, locations determined by the respective location sensors can be used by the controller 408, the machine controller 170, the worksite controller 184, and/or other components of the system 100 to coordinate activities of the machine 104, the rover 408, and/or other components of the system 100.

In any of the examples described herein, the controller 408, the machine controller 170, the electronic devices 182, the worksite controller 184, and/or other components of the system 100 are operable to control respective components of the system 100 in a manual mode, a semi-autonomous mode, and/or a fully-autonomous mode of operation. In an example fully-autonomous mode of operation, a controller of the respective component of the system 100 controls, at least in part, steering, speed, acceleration, deceleration, drum height, drum speed, orientation device operation, replacement tool operation, rover operation, and/or other functions of such components without input from the operator 106. In such examples, and as noted above, the rover 406 comprises an autonomous rover 406. In an example semi-autonomous mode of operation, a controller of the respective component of the system 100 controls one or more such functions, at least in part, without input from the operator 106, but in such a mode of operation, the operator 106 is able to assist or override instructions from the controller before or during performance of such functions. In an example manual mode of operation, the operator 106 manually controls performance of such functions, but the controller of the respective component of the system 100 periodically and/or temporarily controls the performance of such functions (e.g., controlling speed of a component of the system 100 on "cruise control").

With continued reference to FIG. 4, the rover 406 also includes at least one sensor 410 configured to capture sensor data or other information associated with the drum 114. As noted above, such sensor data includes, for example, location information, orientation information, video, and/or one or more images (e.g., still images) of one or more wear parts 116 removably connected to the drum 114. In examples, the sensor 410 is substantially similar to and/or the same as the sensor 134 described above, and the sensor 410 also has a corresponding field of view 412. For instance, the sensor 410 may be an optical sensor, a two-dimensional digital camera, a three-dimensional digital camera, or a range finding sensor, including but not limited to a radar sensor, a LIDAR sensor, a time-of-flight sensor, a high-speed imaging device, or the like. In such examples, the sensor 410 captures sensor data including video and/or images illustrating one or more wear parts 116 disposed on the drum 114. The sensor 410 sends such sensor data to the controller 408, and the controller 408 uses such sensor data to assist in navigating the rover 408 to a location proximate the drum 114 in which the replacement tool 142 can access one or more of the illustrated wear parts 116 for removal thereof. Additionally, similar to the process noted above with respect to FIG. 1, the controller 408 and/or the machine controller 170 utilize sensor data received from the sensor 410 to execute one or more wear models. In doing so, the controller 408 and/or the machine controller 170 are configured to identify one or more wear parts 116 in need of replacing. The controller 408 and/or the machine controller 170 may also provide an indication, based at least in part on the sensor data received from the sensor 410, that one or more wear parts 116 are in need of replacing. In some examples, the controller 408 and/or the machine controller 170 utilize such a wear model to generate an estimated time until one or more wear parts 116 removably connected to the drum 114 will need to be replaced (e.g., a wear duration). In any of the examples described herein, controller 408 and/or the machine controller 170 may employ one or more object recognition algorithms or other programs to assist in identifying and/or classifying objects such as the drum 114, the one or more wear parts 116, etc.

In the example of FIG. 4, the sensor 410 comprises a first sensor carried by the rover 406, and in communication with and/or otherwise operably connected to the controller 408, the machine controller 170, the electronic devices 182, and/or the worksite controller 184. In such examples, the carrier assembly 402 can also include one or more additional sensors in communication with one or more of the above controllers and moveable with the replacement tool 142. For example, the carrier assembly 402 further includes a sensor 414 in communication with the controller 408, the machine controller 170, the electronic devices 182, and/or the worksite controller 184, and moveable with the replacement tool 142. In such examples, the sensor 414 is substantially similar to and/or the same as the sensor 168 described above with respect to FIG. 1. For example, the sensor 414 can capture sensor data including location information, orientation information, video, and/or one or more images of a wear part 116, and the sensor data captured by the sensor 414 can be used to assist in removing one or more of the wear parts 116. For instance, the controller 408 is configured to receive the video, images, and/or other sensor data captured by the sensor 414. The controller 408 is also configured to identify, using such sensor data, one or more wear parts 116 removably connected to the drum 114 in need of replacing. In any of the examples described herein, the controller 408 and/or the machine controller 170 enters such sensor data into an image recognition engine, algorithm, model, or other component. Such components identify the one or more wear parts 116 in need of replacing based on the received sensor data. The controller 408 and/or the machine controller 170 uses the output from such components to control movement of the replacement tool 142 by the orientation device 144. In particular, the controller 408 uses sensor data received from the sensor 414 and/or output received from the image recognition engine or other components noted above to control operation of the orientation device 404. Such operation includes moving the replacement tool 142 to one or more of the replacement positions described herein. For example, such operation includes moving the replacement tool 142 such that an axis of the replacement tool 142 is substantially collinear with the axis 145, and such that one or more arms, cups, end effectors, or other components of the replacement tool 142 mate with the particular identified wear part 116. The controller 408 and/or the machine controller 170 also uses sensor data and/or other information from the sensor 414 to confirm that the replacement tool 142 is properly mated with and/or otherwise positioned relative to the drum 114 and/or the wear part 116 so that the replacement tool 142 can be controlled to remove the wear part 116 from the drum 114. In such examples, the sensor data received from the sensor 404 enables the controller 408 to control movement and operation of the orientation device 404 and/or the replacement tool 142 when removing a wear part 116 from the drum 114 and/or when installing a wear part 116 on the drum 114.

The controller 408 also uses sensor data received from the sensor 414 to control one or more other components of the carrier assembly 402. For example, the carrier assembly 402 includes one or more linkages, and at least one of the linkages is movably connected to the frame rover 406 and/or to other components of the carrier assembly 402, via one or more actuators similar to the actuators 204, 210 described above. Such actuators are configured to control movement of the various linkages relative to a frame of the rover 406. For example, the carrier assembly 402 includes a linkage 416 movably connected to a substantially rigid frame and/or other portion of the rover 406 via a joint 418. The linkage 416 is substantially similar to and/or the same as the linkage 308 described above with respect to FIG. 3. For instance, the linkage 416 comprises one or more shafts, beams, rods, and/or other substantially rigid structures configured to support the weight of the replacement tool 142 and/or other components of the carrier assembly 402 movably mounted to the rover 406. The joint 418 includes, for example, one or more bearings, bushings, ball joints, and/or other such fittings configured to allow complete freedom of movement and/or range of motion between the linkage 416 and the portion of the rover 408 to which the linkage 416 is mounted. Additionally or alternatively, the joint 418 includes one or more actuators similar to and/or the same as the actuators 204, 210 described above.

The carrier assembly 402 can include one or more additional linkage-joint configurations as needed to provide optimal freedom of motion of the replacement tool 142 relative to the rover 406. For example, as shown in FIG. 4 the carrier assembly 402 also includes a linkage 420 movably connected to the linkage 416 via a joint 422. In some examples, the replacement tool 142 is movably connected to the linkage 420. In some examples, the carrier assembly 402 also includes a linkage 424 movably connected to the linkage 420 via a joint 426. In any such examples, a housing of the orientation device 404 is fixedly or movably connected to one or more of the linkages 416, 420, 424 described above, and the replacement tool 142 is connected to the housing of the orientation device 404. In such examples, the linkages 420, 424 are substantially similar to and/or the same as the linkage 416, and the joints 422, 426 are substantially similar to and/or the same as the joint 418. Thus, in such examples the replacement system 400 provides yet another means for removing one or more wear parts 116 from the drum 114 and/or for installing one or more such wear parts 116 on the drum 114. Similar to the replacement systems and other components described above with respect to FIGS. 1-4, the replacement system 400 assists with performing such tasks in a manner that minimizes downtime of the machine 104 associated with replacing worn wear parts 116. As a result, the replacement system 400 improves worksite efficiency, and can minimize maintenance costs associated with wear part failure and/or premature replacement of wear parts 116. The replacement system 400 also improves worksite safety by reducing the risk of injury associated with manually replacing such wear parts 116.

Figure 5:
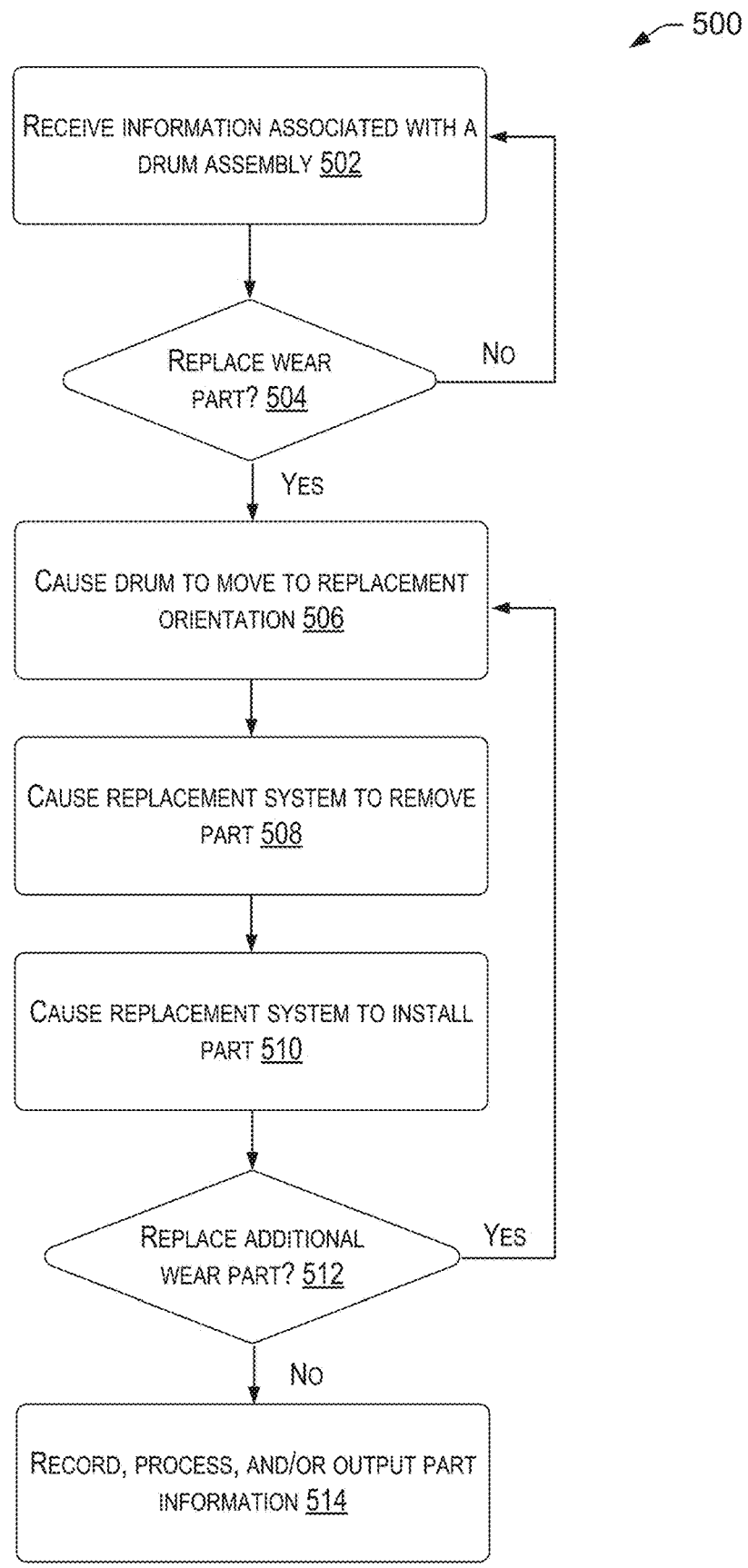
FIG. 5 is a flowchart illustrating a method of replacing a wear part according to an example of the present disclosure.

FIG. 5 illustrates a flow chart depicting an example method 500 related to removing a wear part 116 from a drum 114 and installing a new wear part 116 on the drum 114 in its place. The example method 500 is illustrated as a collection of steps in a logical flow diagram, wherein each step represents acts or operations implemented in hardware, software, or a combination thereof. In the context of software, the steps represent computer-executable instructions stored in memory. When such instructions are executed by, for example, one or more processors of the machine controller 170, the electronic devices 182 the worksite controller 184, the controller 408, and/or other controllers or processors described herein, the instructions cause such components to perform the recited acts or operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, one or more of the steps described with respect to the method 500 can be combined in whole or in part. Additionally in some examples various steps of the method 500 can be combined with other methods. For ease of description, the method 500 will be described below with respect to the system 100, the machine 104, the replacement system 138, the machine controller 170, and/or one or more processors or other components thereof, unless otherwise noted.

At 502, the machine controller 170 receives information associated with the drum assembly 108. For example, at 502 the machine controller 170 controls the sensor 134 to capture location information (e.g., coordinates), orientation information, video, one or more images, and/or other sensor data. In such examples, the sensor data captured by the sensor 134 includes one or more images of a plurality of wear parts 116 removably connected to the drum 114. In such examples, the plurality of wear parts 116 illustrated in the sensor data are disposed within the field of view 136 of the sensor 134, and the images of such wear parts 116 illustrate surfaces (e.g., wear surfaces) of the wear parts 116 that are expected or are designed to wear, as well as surfaces (e.g., the outer surface 118) or structures (e.g., the base block 248, the part holder 282, etc.) that are in proximity to or support the wear parts 116. In some examples, at 502 the machine controller 170 generates and/or provides a notification, via the display 179, to the operator 106 prompting the operator 106 to capture certain images of the wear parts 116 or other portions of the drum 114. In examples, the sensor 134 is configured to capture such sensor data while the drum 114 is at rest, in motion, or in motion below a threshold rotational speed. For example, at 502 the sensor 134 captures sensor data including images illustrating a plurality of wear parts 116 while the drum 114 is rotating at a speed below an operational speed, where the operational speed is the speed at which the drum 114 turns while the machine 104 is operating.

At 504, the machine controller 170 determines, based at least in part on the information received at 502, whether one or more wear parts 116 removably connected to the drum 114 is in need of replacing. For example, at 504 the data processor 174 evaluates the video, images, and/or other information included in the sensor data to determine the presence, health, and/or condition of the wear parts 116 illustrated in one or more images included in the sensor data. In some examples, at 504 the machine controller 170 compares wear part images, profiles, point cloud data, and/or other information included in the sensor data to corresponding information included in the wear model 190. In some examples, at 504 the machine controller 170 and/or the data processing system 188 inputs such sensor data into the wear model 190, one or more machine learning algorithms, one or more image analysis engines, and/or other evaluation models.

As described above with respect to at least FIG. 1, based at least in part on such sensor data, the wear model 190 generates and provides an indication as to whether one or more wear parts 116 included in images contained in the sensor data are in need of replacement. In such examples, at 504 the wear model 190 generates instructions for replacing the wear part 116, and such instructions can be executed by the carrier assembly controller 176 and/or by the replacement tool controller 178 to facilitate replacement of the one or more wear parts 116 by the replacement system 138. Such instructions, and thus the machine controller 170 and/or the wear model 190, can identify, based on the sensor data, particular ones of the wear parts 116 in need of replacing. Such instructions can include and/or identify respective locations on the drum 114 of the particular ones of the wear parts 116 in need of replacing. The wear model 190 can also generate an estimated time until the wear part 116 will need to be replaced, and can generate one or more notifications including such information. At 504, the machine controller 170 can cause the display 179 to output one or more such notifications and/or indications identifying the one or more wear parts 116 in need of replacing.

For example, at 504 the data processor 174 determines whether a profile, two-dimensional image, point cloud model, three-dimensional image, and/or other indication of the condition or wear state of a particular wear part 116 is beyond a corresponding replacement threshold. During this process, the data processor 174 and/or the wear model 190 generate such indications of the condition or wear state at 504, and using the sensor data received at 502. In such examples, the machine controller 170 determines, at 504, whether one or more such indications are beyond (e.g., greater than) the corresponding replacement threshold, thereby indicating that the associated wear part 116 is in need of replacing.

If at 504, the machine controller 170 determines that none of the wear parts 116 included in and/or identified by the sensor data received at 502 are in need of replacing (504: No), the machine controller 170 returns to 502 and continues to receive information associated with the drum assembly 108 and/or the drum 114. If, on the other hand, at 504 the machine controller 170 determines that one or more of the wear parts 116 included in and/or identified by the sensor data received at 502 is in need of replacing (504: Yes), machine controller proceeds to 506.

At 506, the machine controller 170 causes the drum 114 to move to a replacement orientation in which the one or more wear parts identified at 504 are accessible by the replacement system 138 operably connected to the machine controller 170. In some examples, at 506 the operator 106 provides an indication, an input, and/or other such request to the machine controller 170 via the display 179 and/or other user interfaces of the machine 104. In such examples, the machine controller 170 causes the drum assembly 108 to rotate the drum 114 to the replacement orientation based at least in part on such a request. Additionally or alternatively, at 506 the machine controller 170 causes the drum 114 to move to the replacement orientation 506 automatically and/or without input from the operator 106.

At 508, the machine controller 170 causes the replacement system 138 to remove one or more of the wear parts 116 identified at 504. For example, at 508, the machine controller 170 causes the replacement tool 142 of the replacement system 138 to contact, engage, and/or otherwise meet with a particular wear part 116 removably connected to the drum 114 and to remove the wear part 116 from the drum 114. In such examples, at 508 the sensor 168 captures additional sensor data associated with the wear part 116 to be replaced. For example, such additional sensor data includes video, one or more images, and/or other information particular to the wear part 116. The sensor 168 directs such additional sensor data to the machine controller 170.

At 508, the carrier assembly controller 176 causes the orientation device 144 to position the replacement tool 142 relative to the particular wear part 116 to facilitate removal of the wear part 116. For example, the sensor data received at 502 and/or the additional sensor data received from the sensor 168 at 508 includes information indicating the location of the particular wear part 116 on the drum 114. The carrier assembly controller 176 controls the orientation device 144 to position the replacement tool 142 proximate the identified location, and in such examples, the orientation device 144 orients and/or otherwise moves the replacement tool 142 to any of the replacement positions described herein. For instance, in some examples the orientation device 144 positions the replacement tool 142 such that the axis 220 of the replacement tool 142 is substantially collinear with the axis 145 of the wear part 116, and/or such that the replacement tool 142 engages at least a portion of the wear part 116. As described above, positioning the replacement tool 142 in this manner includes, among other things, moving the replacement tool 142, with the orientation device 142, along one or more rails 146 in the direction of arrow 208 and/or in the direction of arrow 206. Such positioning of the replacement tool 142 may also include rotating replacement tool 142, with the orientation device 144, as described above with respect to FIG. 2, and/or moving the replacement tool 142, with the orientation device 142 in a direction substantially parallel to the axis 145.

Additionally, at 508 the replacement tool controller 178 rotates and/or otherwise moves the arms 228, 230 of the replacement tool 142 (e.g., along the axis 220) so as to dispose the end effectors 244, 246 at least partly within corresponding recesses 250, 252 of the base block 248 supporting the wear part 116. Further, at 508 the replacement tool controller 178 rotates and/or otherwise moves the arms 260, 262 of the replacement tool 142 (e.g., along the axis 220) so as to engage at least part of the washer 276 of the wear part 116 with the end effectors 272, 274. At 508, the replacement tool controller 178 also moves and/or otherwise positions the cup 286 of the replacement tool 142 so as to engage at least part of the tip 280 and/or at least part of the washer 276 of the wear part 116. With the wear part 116 engaged as described above, at 508 the replacement tool controller 178 moves the second assembly 256 of the replacement tool 142 in the direction of arrow 156 relative to the base 214 and/or relative to the orientation device 144. Additionally or alternatively, with the wear part 116 engaged as described above, at 508 the replacement tool controller 178 moves the first assembly 218 of the replacement tool 142 in the direction of arrow 158 relative to the base 214 and/or relative to the orientation device 144. Movement of at least one of the first assembly 218 and the second assembly 256 in this way at 508 urges the wear part 116 to disengage from the part holder 282, and thus removes the wear part 116 from the drum 114.

While the end effectors 272, 274 are described herein as engaging the washer 276 to assist in removing the wear part 116 from the part holder 282 at 508, in other examples, the end effectors 272, 274 are configured to grip, cut into, apply opposing forces to, and/or otherwise engage the tip 280 of the wear part 116 at 508 to assist in removing the wear part 116. In such examples, the cup 286 may be omitted, or may at least partially engage a distal end of the tip 280 while the end effectors 272, 274 engage the tip 280 directly. In still other examples, at 508, at least one of the end effectors 272, 274 is configured to access and/or engage a component of the wear part 116 that is at least partly disposed within the part holder 282. For example, at 508, at least one of the end effectors 272, 274 engages the spring clip 278, a shank, and/or other component of the wear part 116 via an opening and/or channel (not shown) in the part holder 282. When so engaged, the at least one of the end effectors 272, 274 applies a force to the wear part 116 in the direction of arrow 156 to assist in removing the wear part 116 from the part holder 282. Such example processes for removing the wear part 116 may be useful in situations in which the washer 276 has been cracked, displaced, damaged, and/or otherwise compromised.

Moreover, in any of the examples described herein, the part holder 282 may comprise a wear part that is removably connected to the drum 114. In such examples, the part holder 282 wears over time due to the relatively harsh conditions in which the drum 114 is employed, and in such examples, one or more of the part holders 282 require removal and/or replacement. It is understood that, in any of the examples described herein, the arms 260, 262 are also configured to assist in removing and/or replacing such worn part holders 282. In such examples, at 508, at least one of the end effectors 272, 274 are configured to grip, apply opposing forces to, rotate, and/or otherwise engage the part holder 282 to assist in removing the part holder 282 from the base block 248. In some such examples, the end effectors 272, 274 are configured to rotate and/or otherwise move the part holder 282 relative to the base block 248 to assist in removing the part holder 282. In other such examples, the end effectors 272, 274 are configured to rotate and/or otherwise remove one or more pins, set screws, bolts, and/or other connectors configured to removably connect the part holder 282 to the base block 248. Additionally or alternatively, at 508, at least one of the end effectors 244, 246 may be configured to perform one or more of the operations described above to assist in removing the part holder 282 from the drum 114. In such examples, the arms 228, 230 are also configured to assist in removing and/or replacing such worn part holders 282.

At 510, the machine controller 170 causes the replacement system 138 to install a wear part 116 on the drum 114 in order to replace the wear part 116 removed at 508. For example, at 510 the carrier assembly controller 176 causes the orientation device 144 to move the replacement tool 142 along the rails 146 such that the replacement tool 142 is positioned to obtain new wear part 116 from the park supply 198. Once properly positioned, the replacement tool controller 178 controls the replacement tool 142 to mate with a wear part 116 disposed in the park supply 198, and the carrier assembly controller 176 causes the orientation device 144 to move replacement tool 142 to the location on the drum 114 of the removed wear part 116 (e.g., the location of the vacant part holder 282). At 510, the replacement tool controller 178 positions the wear part 116 such that a central axis 145 of the wear part 116 is substantially collinear with a corresponding central axis of the recess 284 defined by the part holder 282. When properly positioned at 510, a spring clip 278 of the wear part 116 carried by the replacement tool 142 is positioned over and/or is substantially aligned with the recess 284. At 510, the replacement tool controller 178 causes the second assembly 256 and/or the first assembly 218 to move in the direction of arrow 158 so as to install the spring clip 278 of the wear part 116 substantially completely into the recess 284. Due to engagement between the washer 276 and at least the part holder 282 as the spring clip 278 is inserted into the recess 284 in the direction of arrow 158, the washer 276 remains stationary relative to the part holder 282 as the spring clip 278 is moved in the direction of 158. In such examples, the new wear part 116 is installed onto the drum 114 when the spring clip 278 is substantially completely seated and/or otherwise disposed within the recess 284 and the washer 276 abuts a top portion of the part holder 282.

At 512, the machine controller 170 determines whether one or more additional wear parts 116 removably connected to the drum 114 are in need of replacing. In such examples, the machine controller 170 performs one or more of the steps described above with respect to 504. For example, at 512 the machine controller 170 and/or the data processor 174 determines whether a profile, two-dimensional image, point cloud model, three-dimensional image, and/or other indication of the condition or wear state of a particular wear part 116 is beyond a corresponding replacement threshold. During this process, the data processor 174 and/or the wear model 190 generate such indications of the condition or wear state at 512, and using the sensor data received at 502 and/or at 508. In such examples, the machine controller 170 determines, at 512, whether one or more such indications are beyond (e.g., greater than) the corresponding replacement threshold, thereby indicating that the associated wear part 116 is in need of replacing.

If at 512, the machine controller 170 determines that one or more of the wear parts 116 included in and/or identified by the sensor data received at 502 and/or at 508 is in need of replacing (512: Yes), machine controller returns to 506. If, on the other hand, at 512 the machine controller 170 determines that none of the wear parts 116 included in and/or identified by the sensor data received at 502 and/or at 508 are in need of replacing (512: No), the machine controller 170 proceeds to 514.

At 514, the machine controller 170 records, processes, and/or outputs information associated with one or more of the wear parts 116 replaced at 508 and/or installed at 510. For example, at 514 machine controller 170 records an item number, serial number, SKU number, part number, and/or other identifiers uniquely identifying the wear parts 116 replaced at 508 and/or installed at 510. The machine controller 170 also includes date, time, shift, wear part location (on the drum 114), machine identifier, and/or other information at 514 and associated with the wear parts 116 replaced at 508 and/or installed at 510. At 514, the machine controller 170 records such information at one or more data stores and/or other memory components of the machine controller 170. Additionally or alternatively, at 514 the machine controller 170 provides such information to the control system 186 via the network 180. At 514, the control system 186 stores such information in memory of the worksite controller 184. Additionally or alternatively, at 514 the batch aggregator 192 and/or other components of the data processing system 188 and/or of the maintenance support system 194 categorize, annotate, and/or otherwise process such information for current or future use. In still further examples, at 514 the machine controller 170 generates one or more notifications providing such information, and causes the display 179 and/or one or more of the electronic devices 182 to display and/or otherwise output one or more such notifications via a user interface or other graphical interface.

INDUSTRIAL APPLICABILITY

The disclosed systems and methods find application in any worksite 102 or other environment in which a machine 104 having one or more wear parts 116 is employed to act on a work surface 110. By capturing sensor data illustrating such wear parts 116, the replacement systems described herein determine whether one or more of the illustrated wear parts 116 are in need of replacing. Further, the replacement systems of the present disclosure are configured to quickly and safely remove the wear parts 116 as needed, and replace the removed wear parts 116 with new wear parts 116. The systems described herein also capture and track information uniquely identifying the removed and installed wear parts such that machine-specific, wear part-specific, and/or worksite-specific trend analysis and other analytics can be performed over time.

For example, and with reference to FIG. 1, after finishing a shift, or at some other interval, the machine controller 170 causes the sensor 134 to capture sensor data including images of the wear parts 116 disposed on the drum 114 of the machine 104. The data processor 174 and/or the data processing system 188 determines an amount of wear corresponding to the illustrated wear parts 116 using a wear model 190. If the machine controller 170 determines that one or more of the wear parts 116 is, in fact, in need of replacing, the carrier assembly controller 176 and the replacement tool controller 178 control components of the replacement systems described herein to remove the identified wear parts 116, and install new wear parts 116 on the drum 114 in place of the removed wear parts 116.

Techniques described herein improve efficiency at work sites, such as the worksite 102, and/or improve efficiency of machines, like the machine 104. By way of example and not limitation, techniques described herein ensure that wear parts 116 are properly maintained and/or replaced, which can lead to more efficient use of the machine 104, including but not limited to reduced fuel consumption and/or wear of other, ancillary machine parts. For instance, when wear parts 116 are not replaced, but instead are allowed to fail, the drum 114 may begin to wear or otherwise deteriorate. In this example, replacing or repairing the drum 114 is much more expensive, difficult, and time-consuming than replacing worn wear parts 116 in a timely manner. Moreover, the replacement systems of the present disclosure minimize the safety risks associated with removing and installing wear parts in harsh environments such as the worksite 102.

One having ordinary skill in the art will appreciate that computer programs for implementing the disclosed techniques may be stored on and/or read from computer-readable storage media. The computer-readable storage media may have stored thereon computer-executable instructions which, when executed by a processor, cause the computer to perform, among other things the processes disclosed herein. Exemplary computer-readable storage media includes magnetic storage devices, such as a hard disk, a floppy disk, magnetic tape, or other magnetic storage device known in the art; optical storage devices, such as CD-ROM, DVD-ROM, or other optical storage devices known in the art; and/or electronic storage devices, such as E PROM, a flash drive, or another integrated circuit storage device known in the art. The computer-readable storage media may be embodied by one or more components of the system 100.

It will be apparent to those skilled in the art that various modifications and variations can be made to the disclosed payload overload control system without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims and equivalents thereof.

What is claimed is:

1. A system, comprising:
   a carrier assembly;
   a replacement tool movably supported by the carrier assembly;
   a sensor configured to capture sensor data, the sensor data being associated with a plurality of wear parts removably connected to a rotatable drum, wherein the drum is:
      disposed on a work surface-engaging side of a machine, and
      configured to act on a work surface, from the work surface-engaging side of the machine, while the machine is disposed on the work surface; and
   a controller including a processor, the controller being configured to receive the sensor data from the sensor, and identify, with the processor and using the sensor data, a wear part of the plurality of wear parts in need of replacing, wherein, based at least in part on identification of the wear part by the controller:
      the carrier assembly is configured to move the replacement tool relative to the wear part such that the replacement tool mates with the wear part, and
      the replacement tool is configured to remove the wear part from the drum while the drum remains disposed on the work surface-engaging side of the machine.

2. The system of claim 1, wherein the carrier assembly includes an orientation device operably connected to the controller, the orientation device including at least one actuator and being configured to move the replacement tool in a direction substantially parallel to a central longitudinal axis of the drum.

3. The system of claim 2, wherein the orientation device includes a first actuator configured to move the replacement tool in the direction along at least one stationary rail, and a second actuator configured to rotate the replacement tool relative to the wear part.

4. The system of claim 3, wherein:
   the carrier assembly is configured to move the replacement tool such that a central longitudinal axis of the replacement tool is substantially collinear with a central longitudinal axis of the wear part,
   the replacement tool is configured to remove the wear part from the drum while the central longitudinal axis of the replacement tool is substantially collinear with the central longitudinal axis of the wear part, and
   the second actuator is configured to rotate the replacement tool about an axis extending substantially parallel to the central longitudinal axis of the drum.

5. The system of claim 2, wherein the sensor comprises a first sensor, the carrier assembly further comprising a second sensor in communication with the controller and moveable with the replacement tool.

6. The system of claim 5, wherein the controller is configured to cause movement of the orientation device, and control the replacement tool to remove the wear part based on the sensor data and information received from the second sensor.

7. The system of claim 1, wherein:
   the wear part comprises a first wear part disposed at a first location on the drum, and
   the replacement tool comprises a single replacement tool of the system, the single replacement tool of the system being configured to:
      remove the first wear part from the first location on the drum, and
      install a second wear part at the first location on the drum.

8. A method, comprising:
   receiving, with a controller, sensor data from a sensor, the controller including a processor, and the sensor data being associated with a plurality of wear parts removably connected to a rotatable drum, wherein the drum is:
      disposed on a work surface-engaging side of a machine, and
      configured to act on a work surface, from the work surface-engaging side of the machine, while the machine is disposed on the work surface;
   identifying, with the processor and based on the sensor data, a wear part of the plurality of wear parts in need of replacing;
   causing, with the controller, the drum to move to a replacement orientation in which the wear part is accessible by a replacement system operably connected to the controller, the replacement system including a replacement tool; and
   controlling, with the controller, the replacement tool to:
      mate with the wear part, and
      remove the wear part from the drum while the drum remains disposed on the work surface-engaging side of the machine.

9. The method of claim 8, wherein controlling the replacement tool to mate with the wear part comprises:
   receiving additional sensor data associated with the wear part; and
   based at least in part on the additional sensor data, and with an orientation device movably supported by a carrier assembly of the replacement system, positioning the replacement tool such that an axis of the replacement tool is substantially collinear with an axis of the wear part.

10. The method of claim 9, wherein the additional sensor data is captured by an additional sensor carried by the carrier assembly and moveable with the replacement tool.

11. The method of claim 9, wherein positioning the replacement tool includes
   moving the replacement tool, with the orientation device, in a direction substantially parallel to a central longitudinal axis of the drum, and
   rotating the replacement tool, with the orientation device, about an axis extending substantially parallel to the central longitudinal axis of the drum.

12. The method of claim 8, wherein the replacement tool comprises
   a first assembly having:
      a first platform,
      a cup mounted to the first platform and disposed along a central axis of the replacement tool, the cup being configured to mate with the wear part, and
      a first arm movably connected to the first platform; and
   a second assembly having:
      a second platform opposite the first platform, and
      a second arm movably connected to the second platform, the second arm being configured to mate with a base block disposed on an outer surface of the drum and removably retaining the wear part, the first assembly being moveable relative to the second assembly to assist in removing the wear part from the drum.

13. A milling machine, comprising:

a frame;

a drum rotatable relative to the frame, and relative to a work surface on which the milling machine is disposed, wherein the drum is:

disposed on a work surface-engaging side of the milling machine, and configured to act on the work surface, from the work surface-engaging side of the milling machine, while the milling machine is disposed on the work surface;

a plurality of wear parts removably connected to the drum;

a sensor fixedly connected to the frame such that the plurality of wear parts is within a field of view of the sensor; and an electronic controller including a processor and a memory, the controller being configured to:

receive sensor data from the sensor, the sensor data including an image of the plurality of wear parts;

identify, with the processor, based on the sensor data, and using a component stored in the memory, a wear part of the plurality of wear parts in need of replacing;

cause the drum to move to a replacement orientation in which the wear part is accessible by a replacement system operably connected to the controller, the replacement system comprising a carrier assembly moveable relative to the frame, and a replacement tool movably supported by the carrier assembly; and control the replacement tool to:

mate with the wear part, and remove the wear part from the drum while the drum remains disposed on the work surface-engaging side of the milling machine.

14. The milling machine of claim 13, wherein the controller is in communication with a worksite controller via a network, the controller being configured to provide the sensor data to the worksite controller via the network.

15. The milling machine of claim 13, further comprising a rail connected to the frame and extending substantially parallel to a central longitudinal axis of the drum, wherein a first actuator of the carrier assembly is configured to position the replacement tool, on the rail, and wherein controlling the replacement tool to mate with the wear part comprises:

moving the replacement tool, with the first actuator of the carrier assembly, along the rail and in a direction substantially parallel to a central longitudinal axis of the drum, and rotating the replacement tool, with a second actuator of the carrier assembly, about an axis extending substantially parallel to the central longitudinal axis of the drum such that an axis of the replacement tool is substantially collinear with an axis of the wear part.

* * * * *